United States Patent
LoGalbo et al.

(10) Patent No.: US 8,189,583 B2
(45) Date of Patent: May 29, 2012

(54) SYSTEM AND METHOD FOR PEER-TO-PEER WIDE AREA NETWORK COMMUNICATION

(75) Inventors: Robert D. LoGalbo, Rolling Meadows, IL (US); Bradley M. Hiben, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 417 days.

(21) Appl. No.: 12/240,966

(22) Filed: Sep. 29, 2008

(65) Prior Publication Data

US 2010/0082829 A1  Apr. 1, 2010

(51) Int. Cl.
*H04L 12/56* (2006.01)
(52) U.S. Cl. ......... 370/390; 370/228; 370/312; 370/338
(58) Field of Classification Search ............ 370/228, 370/312, 338, 390
See application file for complete search history.

(56) References Cited

U.S. PATENT DOCUMENTS

| | | | |
|---|---|---|---|
| 6,868,441 B2 * | 3/2005 | Greene et al. | 709/220 |
| 2002/0147611 A1 * | 10/2002 | Greene et al. | 705/1 |
| 2007/0189203 A1 | 8/2007 | Sung et al. | |
| 2008/0181145 A1 | 7/2008 | Chowdhury et al. | |
| 2008/0192652 A1 * | 8/2008 | Rossler et al. | 370/255 |
| 2009/0113059 A1 * | 4/2009 | LoGalbo et al. | 709/227 |
| 2009/0144441 A1 * | 6/2009 | LoGalbo et al. | 709/235 |
| 2009/0327435 A1 * | 12/2009 | LoGalbo et al. | 709/206 |

OTHER PUBLICATIONS

PCT International Search Report Dated Jun. 10, 2010.
PCT International Report on Patentability Dated Apr. 7, 2011.

* cited by examiner

*Primary Examiner* — Phuoc Nguyen
(74) *Attorney, Agent, or Firm* — Randi L. Karpinia; Daniel R. Bestor

(57) ABSTRACT

A method of operating a peer to facilitate fast group communication between subscribers in a peer-to-peer wide area network is disclosed. In the peer-to-peer wide area network, each of the subscribers are affiliated to a talkgroup, and further registered to at least one peer within the peer-to-peer wide area network. In operation, the peer exchanges messages with other peers to determine that one or more peers listed in a talkgroup topology is still active. When the peer receives a media for a talkgroup from a subscriber affiliated to the talkgroup, the peer duplicates the media for the talkgroup, and unicasts the duplicate media to the one or more peers that are listed as active in the talkgroup topology to enable the one or more peers to deliver the media to the respectively registered subscribers affiliated to the talkgroup.

25 Claims, 17 Drawing Sheets

| subscriberID | peerToWhich Subscriber Registered | slotOnWhich AffiliationRxed | TGToWhich Subscriber Affiliated | registration Expiration Time |
|---|---|---|---|---|
| $S_{52}$ | PEER5 | 1 | TgA | 12:30:08 |
| $S_{34}$ | PEER3 | 1 | TgA | 12:28:43 |
| $S_{21}$ | PEER2 | 2 | TgB | 12:35:24 |
| $S_{83}$ | PEER8 | 2 | TgB | 12:37:18 |
| $S_{63}$ | PEER6 | 2 | TgC | 12:25:53 |
| $S_{11}$ | N/A | N/A | N/A | N/A | masterSubTopology DATABASE MAINTAINED BY SS RESIDING AT PEER 5

*FIG. 4*

| subscriberID | peerToWhich Subscriber Registered | slotOnWhich AffiliationRxed | affiliation Expiration Time |
|---|---|---|---|
| $S_{15}$ | PEER1 | 1 | 12:25:53 |
| $S_{52}$ | PEER5 | 1 | 12:30:08 |
| $S_{34}$ | PEER3 | 1 | 12:28:03 | masterTgTopology(TgA) DATABASE MAINTAINED BY TS RESIDING WITHIN PEER 4

*FIG. 5*

| peerID | slot |
|---|---|
| PEER1 | 1 |
| PEER5 | 1 |
| PEER3 | 1 |
| PEER2 | 2 |

TgTopology(TgA)

| subscriber ID | peerToWhich Subscriber Registered | slotOnWhich AffiliationRxed | affiliation ExpirationTime |
|---|---|---|---|
| $S_{15}$ | PEER1 | 1 | 12:25:53 |
| $S_{52}$ | PEER5 | 1 | 12:30:08 | masterTgTopology(TgA)

| subscriber ID | peerToWhich Subscriber Registered | slotOnWhich AffiliationRxed | TGToWhich Subscriber Affiliated | registration ExpirationTime |
|---|---|---|---|---|
| $S_{52}$ | PEER5 | 1 | TgA | 12:30:08 |
| $S_{34}$ | PEER3 | 1 | TgA | 12:28:43 |
| $S_{21}$ | PEER2 | 2 | TgB | 12:35:24 |
| $S_{83}$ | PEER8 | 2 | TgB | 12:37:18 |
| $S_{63}$ | PEER6 | 2 | TgC | 12:25:53 |
| $S_{11}$ | PEER1 | 1 | TgA | 12:39:27 |

UPDATED masterSubTopology MAINTAINED BY SS (PEER 5)

*FIG. 11*

| subscriber ID | peerToWhich Subscriber Registered | slotOnWhich AffiliationRxed | TGToWhich Subscriber Affiliated | registration ExpirationTime |
|---|---|---|---|---|
| $S_{52}$ | PEER5 | 1 | TgA | 12:30:08 |
| $S_{34}$ | PEER3 | 1 | TgA | 12:28:43 |
| $S_{21}$ | PEER2 | 2 | TgB | 12:35:24 |
| $S_{83}$ | PEER8 | 2 | TgB | 12:37:18 |
| $S_{63}$ | PEER6 | 2 | TgC | 12:25:53 |
| $S_{11}$ | PEER1 | 1 | TgB | 12:39:27 |

UPDATED masterSubTopology MAINTAINED BY SS (PEER 5)

*FIG. 13*

| subscriber ID | peerToWhich Subscriber Registered | slotOnWhich AffiliationRxed | TGToWhich Subscriber Affiliated | registration ExpirationTime |
|---|---|---|---|---|
| $S_{52}$ | PEER5 | 1 | TgA | 12:30:08 |
| $S_{34}$ | PEER3 | 1 | TgA | 12:28:43 |
| $S_{21}$ | PEER2 | 2 | TgB | 12:35:24 |
| $S_{83}$ | PEER8 | 2 | TgB | 12:37:18 |
| $S_{63}$ | PEER6 | 2 | TgC | 12:25:53 |
| $S_{11}$ | N/A | N/A | N/A | N/A |

UPDATED masterSubTopology MAINTAINED BY SS (PEER5)

*FIG. 15*

SYSTEM AND METHOD FOR PEER-TO-PEER WIDE AREA NETWORK COMMUNICATION

FIELD OF THE DISCLOSURE

The present disclosure relates generally to wireless communication systems and more particularly to fast group communication between subscribers in peer-to-peer wide area networks within a wireless communication system.

BACKGROUND

A wide area network (WAN) is a network which covers a large geographical area, and uses communications circuits and systems to connect participating network nodes. "Wide area" coverage is defined by a number of fixed base stations which are typically distributed geographically over a large area and are connected over a wired network. Often these stations are distributed in such a way that no one station could cover the same geographic area by itself (however this isn't always the reason for such a wide area network). This enables a first mobile wireless radio within the coverage of a first fixed base station to communicate with other (second, third, etc.) mobile wireless radios within the coverage of remote fixed (second, third, etc.) base stations. Other types of units which can be on the wide area network (WAN) are console units— these are units where users can communicate to other console users as well as mobile radio users; however the console connects to the network over a wire rather than wirelessly.

Wireless wide area networks utilize communication technologies such as WIMAX (Worldwide Interoperability for Microwave Access), UMTS (Universal Mobile Telecommunications Service), GPRS (General Packet Radio Service), CDMA (Code division multiple access), GSM (Global System for Mobile communications), CDPD (Cellular Digital Packet Data), HSDPA (High-Speed Downlink Packet Access), 3G (third generation), 4G (fourth generation), and the like, to transfer data.

Within a wide area network, a variety of communication scenarios can co-exist. For example, one use of the wide area network is to enable a group call that allows one mobile radio user to transmit to many mobile radio users who are listening. Other examples of communication scenarios within a wide area network are a private call (e.g., a private call from one mobile radio to another mobile radio), a short data call (e.g. text messaging), and an emergency call. Conventional wide area network topologies use a centralized infrastructure such as a centralized controller within a wide area network to maintain and distribute mobility information of mobile radio users to intended stations. Such distribution of mobility information of a mobile radio user may either occur periodically after the establishment of a group call or a private call or an emergency call. Detrimentally, distributing such mobility information during such calls maximizes the media delay. Further, having a centralized controller to perform the functions of maintaining and distributing mobility information to stations affects the scalability of the wide area network and is susceptible to a single point of failure thereby affecting the entire system.

In addition, in such wide area networks utilizing a centralized controller, a mobile radio user wishing to establish a group call with other mobile radio users within the group must send the media to all the stations within the wide area network, irrespective of whether that particular station is serving a mobile radio user belonging to the group. In this case, the bandwidth is not efficiently utilized as the media is sent to all the stations including those stations which are not serving any mobile radio users belonging to the group. Accordingly, there is a need for a system and method for wide area network (WAN) communication that reduces media delay, eliminates single points of failure, and reduces bandwidth consumption associated with communication between stations as well as from stations to subscribers.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 illustrates an example structure of a master subscriber topology database maintained by Subscriber Steward in accordance with some embodiments.

FIG. 5 illustrates an example structure of a master talkgroup topology database maintained by Talkgroup Steward in accordance with some embodiments.

FIG. 11 illustrates an updated master subscriber topology database in accordance with some embodiments.

FIG. 13 illustrates an updated master subscriber topology database in accordance with some embodiments.

FIG. 15 illustrates an updated master subscriber topology database in accordance with some embodiments.

Figure 1:
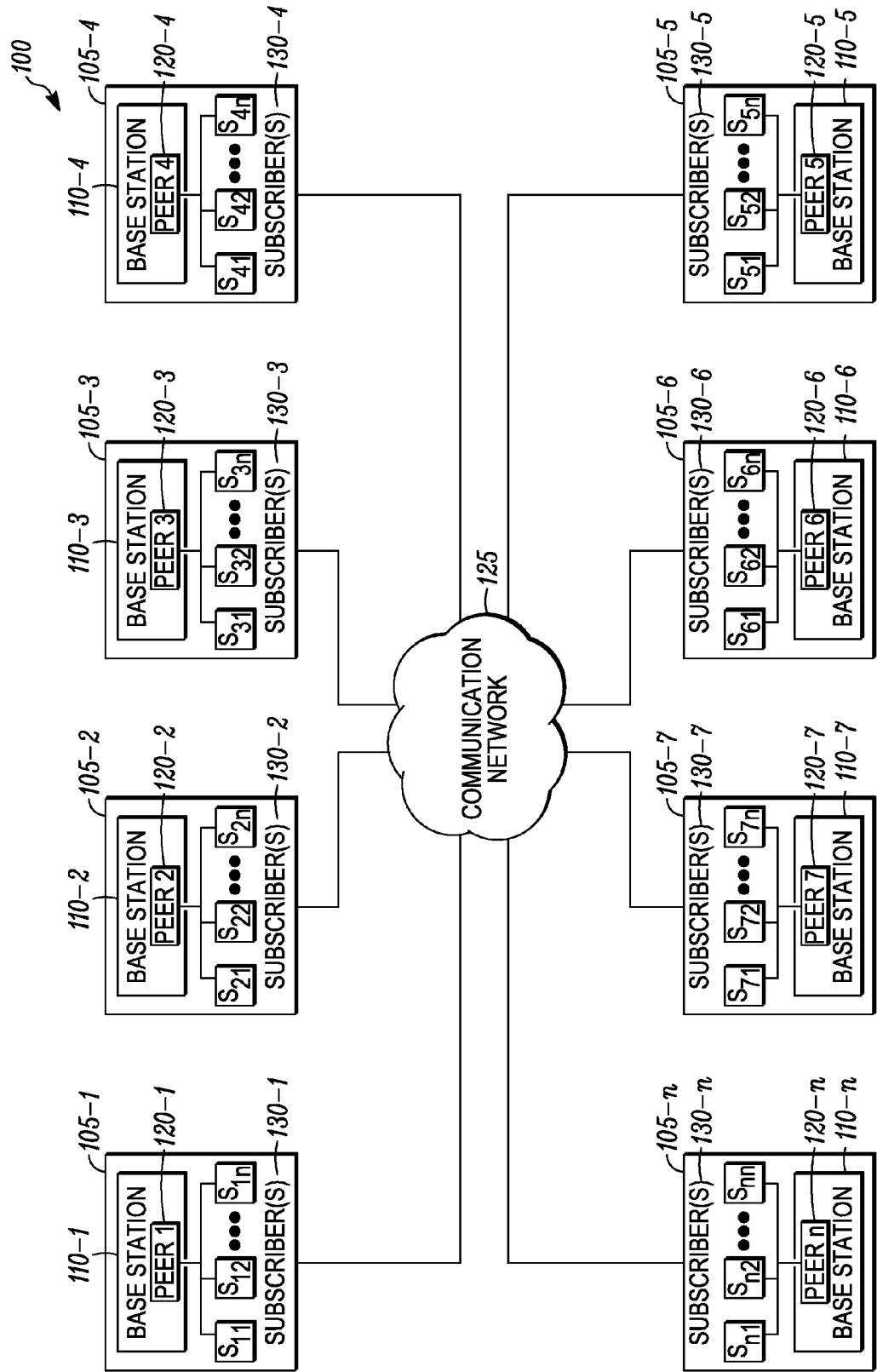
FIG. 1 is a block diagram of an example wide area network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the disclosure.

The apparatus and method components have been represented where appropriate by conventional symbols in the drawings, showing only those specific details that are pertinent to understanding the embodiments of the disclosure so as not to obscure the disclosure with details that will be readily apparent to those of ordinary skill in the art having the benefit of the description herein.

DETAILED DESCRIPTION

Disclosed is a method of operating a peer to facilitate fast group communication between subscribers in a peer-to-peer wide area network. In the peer-to-peer wide area network, each of the subscribers are affiliated to a talkgroup, and further registered to at least one peer within the peer-to-peer wide area network. In operation, the peer exchanges messages with other peers to determine that one or more peers listed in a talkgroup topology is still active. When the peer receives a media for a talkgroup from a subscriber affiliated to the talkgroup, the peer duplicates the media for the talkgroup, and unicasts the duplicate media to the one or more peers that are listed as active in the talkgroup topology to enable the one or more peers to deliver the media to the respectively registered subscribers affiliated to the talkgroup.

Further, a Subscriber Steward configured within a peer maintains a master subscriber topology database including information related to at least one subscriber assigned to the Subscriber Steward, a peer to which each of the at least one subscriber is registered, and a talkgroup to which each of the at least one subscriber is affiliated. The Subscriber Steward sends an update to a Talkgroup Steward that controls a talkgroup about information related to one or more of the at least one subscriber that are affiliated to the talkgroup. The Talkgroup Steward which is configured within a peer updates a master talkgroup topology database based on the update received from the Subscriber Steward, the master talkgroup topology database including information related to the one or more of the at least one subscriber affiliated to the talkgroup controlled by the Talkgroup Steward, and a peer to which each of the one or more of the at least one subscriber is registered. The Talkgroup Steward also generates a talkgroup topology including information related to one or more peers with which the one or more of the at least one subscriber affiliated to the talkgroup are still registered and sends the talkgroup topology to each of the one or more peers, such that, when a subscriber of the one or more of the at least one subscriber registered with one of the one or more peers initiates a group communication for the talkgroup, the one of the one or more peers duplicates media associated with the group communication and sends the duplicated media to only those peers which information is included in the talkgroup topology, for delivery of the media to the respectively registered subscribers affiliated to the talkgroup.

Architecture of Peer-to-Peer Wide Area Network

FIG. 1 illustrates a peer-to-peer (P2P) wide area network 100 in which methods and systems for facilitating fast group communication between subscribers, are implemented in accordance with some embodiments. As illustrated, the peer-to-peer wide area network 100 includes a plurality of network locations 105-$n$, each geographically separated from the other network locations. For example, network location 105-1 can be in Japan, network location 105-2 can be in the United Kingdom, network location 105-3 can be in Columbia, network location 105-4 can be in the United States of America, network location 105-5 can be in Australia, and network location 105-6 can be in Egypt. It will be appreciated by those of ordinary skill in the art that each of the plurality of network locations 105-$n$ can be located anywhere within the terrestrial earth; and further can be near or far from the other network locations in accordance with the embodiments.

A base station 110-$n$ can be located at each network location 105-$n$. Each base station 110-$n$ is a base station that is a fixed (non-mobile), full-duplex, radio frequency (RF) (wireless) modem (capable of having both a transmit and a receive frequency pair) which receives control and media (data/voice) from one or more mobile radios and presents the control/media to an entity (the Peer) which typically coincides within the base station. The Peer sends the control/media to other Peers on the WAN. In turn, when the base station's Peer receives control/media from other Peers on the wire, the Peer forwards the control/media to the base station so that the base station may transmit the media wirelessly to the one or more mobile radios.

A Peer 120-$n$, in accordance with some embodiments, is a functional unit located within each base station 110-$n$ or console unit. For example, as illustrated in FIG. 1, Peer1 120-1 resides within base station 110-1, Peer2 120-2 resides within base station 110-2, Peer3 120-3 resides within base station 110-3, Peer4 120-4 resides within base station 110-4, Peer5 120-5 resides within base station 110-5, Peer6 120-6 resides within the base station 110-6, Peer7 120-7 resides within the base station 120-7, and PeerN 120-$n$ resides within the base station 110-$n$. It will be appreciated by those of ordinary skill in the art that each Peer 120-$n$ can alternatively reside in a separate box, adjacent to the base station. The Peers 120-$n$ terminate the functions necessary to maintain the network with other Peers 120-$n$ on the WAN as well as interface the respective base station. Each Peer 120-$n$ enables WAN functionality over a communication network 125 for the base station. The communication network 125 may include one or more of private networks, public networks, such as the Internet, wireless networks, such as satellite and cellular networks, and local area wireless networks, such as Wireless Fidelity (WiFi) or Bluetooth networks, local area networks (LANs), wide area networks (WANs), telephone networks, such as the Public Switched Telephone Networks (PSTN), or a combination of networks.

In accordance with some embodiments, the Peers 120-$n$ are behind a firewall (not shown) which serves to provide a means of protection for the associated base station which operates within the communication network 125. For example, firewalls do not allow packets to be received unsolicited from other hosts, computers, devices, and the like on the communication network 125.

Note that the WAN topology of FIG. 1 is for illustrative purposes, and that the P2P WAN 100 can alternatively include any combination of tiered base stations. It will be appreciated by those of ordinary skill in the art that the P2P WAN 100 can comprise of at least two "peered" base stations. For example, the P2P WAN can comprise two or more base stations, two or more consoles, one base station and one or more consoles, one console and one or more base stations, more than one base station and more than one console, or any other similar combination.

Within each network location 105-*n*, one or more subscribers 130-*n* can communicate through the respective base stations 110 to other devices within the P2P WAN 100. For example, as illustrated in FIG. 1, subscribers $S_{11}$, $S_{12}$, $S_{13} \ldots S_{1n}$ 130-1 are located within network location 105-1, subscribers $S_{21}$, $S_{22}$, $S_{23} \ldots S_{2n}$ 130-2 are located within network location 105-2, and subscribers $S_{n1}$, $S_{n2}$, $S_{n3} \ldots S_{nn}$ 130-*n* are located within network location 105-*n*. The subscribers 130 may include devices, such as mobile telephones, mainframe computers, minicomputers, desktop computers, laptop computers, notebook computers, personal digital assistants, or the like. The subscribers 130 can transmit data over the communication network 125 or receive data from the communication network 125 via a wired, wireless, or optical connection. As used herein, P2P is a topology where "Peers" talk directly to each other without go-betweens. Peer-to-peer is a communications model in which each party has the same basic capabilities and either party can initiate a communication session.

Components of Peers

Figure 2:
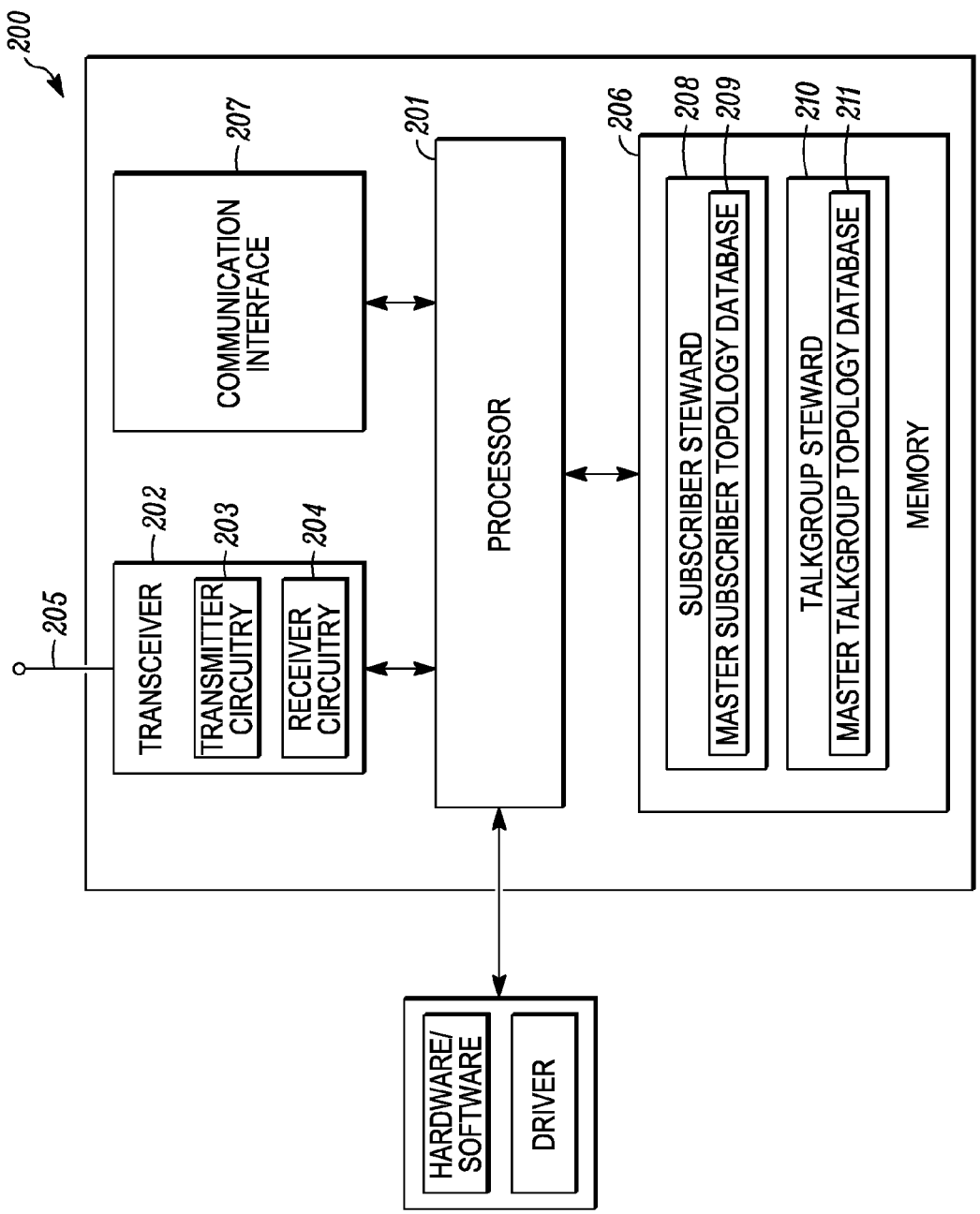
FIG. 2 is a block diagram of components employed in a Peer operating in the wide area network of FIG. 1 in accordance with some embodiments.

FIG. 2 is a block diagram 200 illustrating some components that can be employed in Peers 120 operating in the P2P WAN 100 of FIG. 1, in accordance with some embodiments. Optionally, one or more of the components included in Peer 120 can be employed in subscribers 130. The Peer 120 comprises a processor 201, one or more transceivers 202, each including a transmitter circuitry 203 and a receiver circuitry 204, an antenna 205 coupled to at least one of the transceivers 202, a memory 206 for storing operating instructions that are executed by the processor 201, and a communication interface 207. The transceiver 202 receives and transmits signals, such as packetized signals, to and from subscribers 130, under the control of a processor 201. In one embodiment, the communication interface 207 includes an Ethernet wired local area network (LAN) interface to send/receive packet internet protocol (IP) data between Peers 120 over the communication network 125 such as the internet. Alternatively, the communication interface 207 can include a wireless LAN interface to wirelessly communicate packet IP data between Peers 120.

The Peer 120 optionally includes a display, an input device, and a buffer memory. Although not shown, the Peer 120 also includes an antenna switch, duplexer, circulator, or other highly isolative means (not shown) for intermittently providing information packets from the transmitter circuitry 203 of the transceiver 202 to the antenna 205 and from the antenna 205 to the receiver circuitry 204 of the transceiver 202. The Peer 120 can be an integrated unit containing at least all the elements depicted in FIG. 2, as well as any other elements necessary for the Peers 120 to perform its particular functions. Alternatively, the Peer 120 can comprise a collection of appropriately interconnected units, wherein such units perform functions that are equivalent to the functions performed by the elements of the Peers 120.

The processor 201 includes one or more microprocessors, microcontrollers, DSPs (digital signal processors), state machines, logic circuitry, or any other device or devices that process information based on operational or programming instructions. Such operational or programming instructions are, for example, stored in the memory 206. The memory 206 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 206 containing the corresponding operational instructions may be embedded within the state machine or logic circuitry. The operations performed by the processor 201 and the rest of the components of Peer 120 are described in detail below.

The transmitter circuitry 203 and the receiver circuitry 204 enable the Peers 120-*n* to communicate information packets to and acquire information packets from subscribers 130-*n*. In this regard, the transmitter circuitry 203 and the receiver circuitry 204 include conventional circuitry to enable digital or analog transmissions over a wireless communication channel. The transmitter circuitry 203 and the receiver circuitry 204 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, 802.11 WLAN (wireless local area network), 802.16 WiMax, and the like).

The implementations of the transmitter circuitry 203 and the receiver circuitry 204 depend on the implementation of the Peers 120. For example, the transmitter circuitry 203 and the receiver circuitry 204 can be implemented as an appropriate wireless modem, or as conventional transmitting and receiving components of two-way wireless communication devices. In the event that the transmitter circuitry 203 and the receiver circuitry 204 are implemented as a wireless modem, the modem can be internal to the Peers 120 or insertable into the Peers 120 (e.g., embodied in a wireless radio frequency (RF) modem implemented on a Personal Computer Memory Card International Association (PCMCIA) card). For a wireless communication device, the transmitter circuitry 203 and the receiver circuitry 204 can be implemented as part of the wireless device hardware and software architecture in accordance with known techniques. Most, if not all, of the functions of the transmitter circuitry 203 and/or the receiver circuitry 204 can be implemented in a processor, such as the processor 201. However, the processor 201, the transmitter circuitry 203, and the receiver circuitry 204 have been artificially partitioned herein to facilitate a better understanding.

The antenna 205 comprises any known or developed structure for radiating and receiving electromagnetic energy in the frequency range containing the wireless carrier frequencies.

The memory 206 includes a Subscriber Steward (SS) 208 and a Talkgroup Steward (TS) 210. In accordance with some embodiments, the Peer 120 can have more than one Subscriber Steward 208 or Talkgroup Steward 210 resident on it. The Subscriber Steward 208 is an entity within the Peer 120 that keeps track of all the subscribers 130 that are assigned to the Subscriber Steward 208. In other words, the Subscriber Steward 208 regulates the state of each of the subscribers 130 that are assigned to the Subscriber Steward 208. In accordance with some embodiments, the Subscriber Steward 208 ensures registration of a subscriber 130 that is assigned to the Subscriber Steward 208 to at most one Peer 120 within the P2P WAN 100. As used herein, the registration of subscriber 130 to a Peer 120 requires that all media pertinent and available on the P2P WAN 100 be routed to Peer 120 so that the Peer120 can deliver the media to the subscriber 130. In accordance with some embodiments, the Subscriber Steward 208 further ensures affiliation of a subscriber 130 to at most one talkgroup. As used herein, the affiliation of a subscriber 130 to a talkgroup requires that all media pertinent to that talkgroup be routed to the subscriber 130. The Subscriber Steward 208 may also ensure that each of its subscribers is registered maximally to one communication slot.

The Subscriber Steward 208 maintains a Master Subscriber Topology Database 209 (also referred to as "masterSubTopology" table). The Master Subscriber Topology Database 209 is a database that includes information related to one or more of the subscribers 130 within the P2P WAN 100 that are assigned to the Subscriber Steward 208. The table masterSubTopology 209 contains state for many subscribers. Each row of the masterSubTopology table 209 contains state for a given subscriber. The structure and content of masterSubTopology 209 is described in FIG. 4.

Each Subscriber 130 that is assigned to the Subscriber Steward 208 periodically sends inbound registration and affiliation messages over the air (OTA) to the Subscriber Steward 208 to establish and maintain its presence (registration) at a Peer 120 (e.g., base station 110). If the Subscriber Steward 208 does not receive registration/affiliation messages from its subscriber for a predefined time period, for example, at approximately twice a periodic rate, the Subscriber Steward 208 notifies a Talkgroup Steward (TS) 210 to inform that the subscriber should no longer be affiliated to the talkgroup controlled by the Talkgroup Steward 210, removes information related to a Peer 120 (Peer ID) to which the registration message was received from the Master Subscriber Topology Database 209 on the Subscriber Steward 208, removes the communication slot information to which the registration was received from the Master Subscriber Topology Database 209 on the Subscriber Steward 208, and notifies any other processes that need to be informed that the subscriber 130 is no longer registered.

In accordance with some embodiments, each subscriber 130 within the WAN 100 is assigned to one Subscriber Steward (SS) 208. More than one Subscriber Steward 208 can be resident on a Peer 120 (e.g. an SS 208 can be responsible for multiple subscribers 130). Although FIG. 2 illustrates a Subscriber Steward 208 residing at a Peer 120, it is possible for some of the Peers 120-*n* within the WAN 100 to have no SS's resident upon it. In accordance with some embodiments, the Subscriber Steward 208 can have additional Subscriber Stewards in other Peers 120. In this case, the initial Subscriber Steward is referred to as a "Primary Role Provider (PRP)," and the additional Subscriber Steward is referred to as a "Subsidiary Role Provider (SRP)." The SRP functions as a backup to the PRP, and maintains a backup Master Subscriber Topology Database (also referred to as "backupMasterSubTopology"). The masterSubTopology 209 is also referred to as "setOfTablesToBackup" for Subscriber Stewards acting as PRP. The SRP periodically receives information via "setOfTablesToBackup" message from the PRP, and updates the backupMasterSubTopology table. The SRP can promote itself to take the role of PRP in case of a failure in PRP.

The Talkgroup Steward 210 is an entity within the peer 120 that keeps track of all the subscribers who are members of a given talkgroup. As used herein, the term "talkgroup" identifies a predefined group of subscribers who can participate in a group communication using the talkgroup. Any subscriber on the talkgroup can initiate and participate in talkgroup calls, as long as they are affiliated to the talkgroup. Each talkgroup has one Talkgroup Steward 210. The Talkgroup Steward 210 regulates the state of each of the subscribers that are members of its talkgroup. The Talkgroup Steward 210 maintains a Master Talkgroup Topology Database 211 (also referred to as masterTgTopology(Tg)). The Master Talkgroup Topology Database 211 is a database that includes information related to one or more of the subscribers 130 within the WAN 100 that are affiliated to a corresponding talkgroup. Each Talkgroup Steward 210 maintains one such table. The structure and content of masterTgTopology(Tg) table 211 is described in relation to FIG. 5 hereinafter.

According to some embodiments, when a Peer 120 receives media (e.g., audio) for a given talkgroup from a subscriber 130, the Talkgroup Steward 210 ensures that the Peer 120 routes that talkgroup media only to the other Peers 120 which has registered subscribers affiliated to the given talkgroup. In some embodiments, each talkgroup can have an additional Talkgroup Steward. In this case, the initial talkgroup Steward is referred to as a "Primary Role Provider (PRP)," and the additional Talkgroup Steward is referred to as a "Subsidiary Role Provider (SRP)." The SRP functions as a backup to the PRP, and maintains a backup Master Takgroup Topology Database (also referred to as "backupMasterTgTopology(Tg)"). The SRP periodically receives information from the PRP, and updates the backupMasterTgTopology (Tg) table. The SRP can promote itself to take the role of PRP in case of a failure in PRP.

Logical Structure of Peer-to-Peer Wide Area Network

Figure 3:
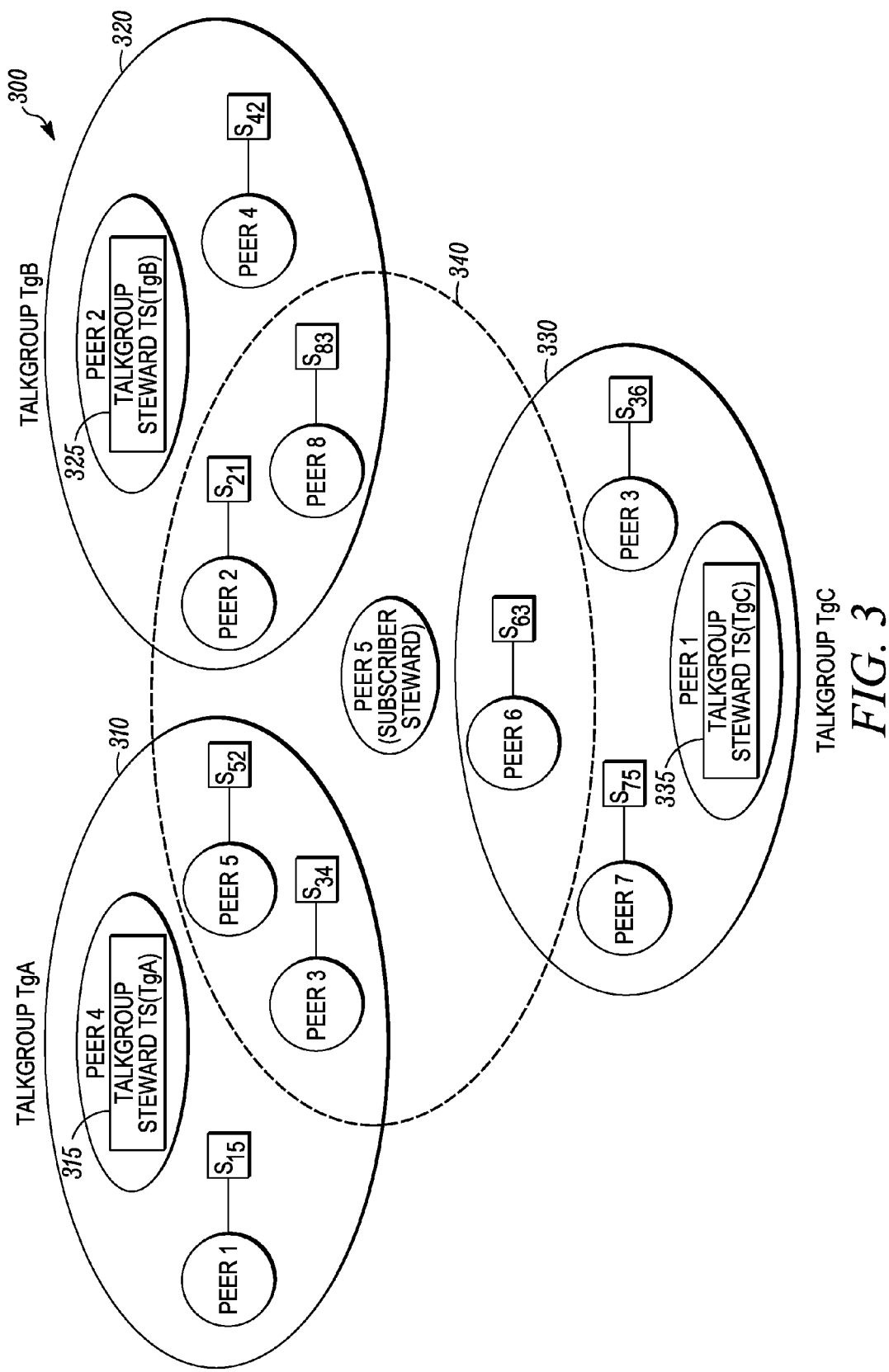
FIG. 3 illustrates a logical structure of a peer-to-peer wide area network illustrating talkgroups, Talkgroup Stewards and a Subscriber Steward in accordance with some embodiments.

FIG. 3 illustrates a logical structure 300 of a peer-to-peer wide area network. Particularly, FIG. 3 illustrates three talkgroups TgA 310, TgB 320, and TgC 330. For example, as shown in FIG. 3, the subscribers $S_{15}$ 130-1, $S_{52}$ 130-5, and $S_{34}$ 130-3 are affiliated to Talkgroup TgA 310, where the subscribers $S_{15}$ 130-1, $S_{52}$ 130-5, and $S_{34}$ 130-3 are registered with the Peer1 120-1, Peer5 120-5, and Peer3 120-3, respectively. The Talkgroup Steward TS(TgA) 315 residing within the Peer4 120-4 serves as the Talkgroup Steward 210 for Talkgroup TgA 310. The Subscribers $S_{21}$ 130-2, $S_{42}$ 130-4, and $S_{83}$ 130-8 are affiliated to Talkgroup TgB 320, where the subscribers $S_{21}$ 130-2, $S_{42}$ 130-4, and $S_{83}$ 130-8 are registered with the Peer2 120-2, Peer4 120-4, and Peer8 120-8, respectively. The Talkgroup Steward TS(TgB) 325 residing within the Peer2 120-2 serves as the Talkgroup Steward 210 for Talkgroup TgB 320. Also, the talkgroup TgC 330 has subscribers $S_{75}$ 130-7, $S_{36}$ 130-3, and $S_{63}$ 130-6 affiliated to it. The subscribers $S_{75}$ 130-7, $S_{36}$ 130-3, and $S_{63}$ 130-6 are registered with the Peer7 120-7, Peer3 120-3, and Peer6 120-6, respectively. The Talkgroup Steward TS(TgC) 335 residing within the Peer1 120-1 serves as the Talkgroup Steward 210 for Talkgroup TgC 330. Each of the Talkgroup Stewards TS(TgA) 315, TS(TgB) 325, and TS(TgC) 335 maintains a Master Talkgroup Topology Database 211 that regulates the state of its respective subscribers.

Further, FIG. 3 illustrates a logical group 340 that includes a group of subscribers $S_{52}$ (TgA), $S_{34}$ (TgA), $S_{21}$ (TgB), $S_{83}$ (TgB), and $S_{63}$ (TgC) that are assigned to a Subscriber Steward 208 residing within the Peer5 120-5. In this example, the Subscriber Steward 208 residing within the Peer5 120-5 regulates the state of each of its subscribers $S_{52}$ (TgA), $S_{34}$ (TgA), $S_{21}$ (TgB), $S_{83}$ (TgB), and $S_{63}$ (TgC) including maintaining information related to affiliated talkgroups and registered peers corresponding to each of its subscribers in its Master Subscriber Topology Database 209. Note that the logical structure of P2P WAN 100 as shown in FIG. 1 is for illustrative purposes, and that the P2P WAN 100 can alternatively include any number of talkgroups, and each talkgroups serving any number of subscribers.

Master Subscriber Topology Database

FIG. 4 illustrates one example of structure 400 of the Master Subscriber Topology Database 209 maintained by the Subscriber Steward 208 residing, for example, within the Peer5 120-5 is shown. The table masterSubTopology 209 contains the following columns (there is one row per subscriber 130): subscriberID column 405, peerToWhichSubscriberRegistered column 410, slotOnWhichAffiliationRxed column 415, TGToWhichSubscriberAffiliated column 420, and registrationExpirationTime column 425. A row for a subscriberID column 405 can be created/deleted by a central registrar (not shown) that is responsible for assigning/removing the role of being an SS 208 for a given subscriber. The subscriberID column 405 includes subscriber identification (subscriber ID) value that identifies a subscriber 130 assigned to the Subscriber Steward 208. The peerToWhichSubscriberRegistered column 410 includes Peer identification (Peer ID) value that identifies a Peer 120 to which the subscriber 130 has registered. The slotOnWhichAffiliationRxed column 415 includes a slot value that identifies a communication slot on which the Peer 120 has received the Registration/Affiliation Message over the air from the subscriber 130. In one example, the communication slot is a time division multiplexing (TDM) slot, and the slot value is either one or two. The TGToWhichSubscriberAffiliated column 420 includes a talkgroup identification (Talkgroup ID) value that identifies a talkgroup to which the subscriber 130 is affiliated. The registrationExpirationTime column 425 represents a time value occurring in the future at which the registration will expire for the subscriber 130. Note that the time values shown in FIGS. 4, 5, 9, 11, 13, and 15 and the accompanying description are for illustrative purposes, and that the time value can alternatively include any time values and be represented in any time formats.

As shown in FIG. 4, the row 430 includes subscriber $S_{52}$ 130-5, a Peer5 120-5 to which the subscriber $S_{52}$ 130-5 is registered, a slot value of one (1) on which the Peer5 120-5 received affiliation message from the subscriber $S_{52}$ 130-5, a talkgroup TgA 310 to which the subscriber $S_{52}$ 130-5 is affiliated, and a registration expiration time of 12:30:08 (in Hours:Minutes:Seconds) at which the registration will expire for the subscriber $S_{52}$ 130-5. The row 435 includes subscriber $S_{34}$ 130-3, a Peer3 120-3 to which the subscriber $S_{34}$ 130-3 is registered, a slot value of one (1) on which the Peer3 120-3 received affiliation message from the subscriber $S_{34}$ 130-3, a talkgroup TgA 310 to which the subscriber $S_{34}$ 130-3 is affiliated, and a registration expiration time of 12:28:43 at which the registration will expire for the subscriber $S_{34}$ 130-3. The row 440 includes subscriber $S_{21}$ 130-2, a Peer2 120-2 to which the subscriber $S_{21}$ 130-2 is registered, a slot value of two (2) on which the Peer2 120-2 received affiliation message from the subscriber $S_{21}$ 130-2, a talkgroup TgB 320 to which the subscriber $S_{21}$ 130-2 is affiliated, and a registration expiration time of 12:35:24 at which the registration will expire for the subscriber $S_{21}$ 130-2. The row 445 includes subscriber $S_{83}$ 130-8, a Peer8 120-8 to which the subscriber $S_{83}$ 130-8 is registered, a slot value of two (2) on which the Peer8 120-8 received affiliation message from the subscriber $S_{83}$ 130-8, a talkgroup TgB 320 to which the subscriber $S_{83}$ 130-8 is affiliated, and a registration expiration time of 12:37:18 at which the registration will expire for the subscriber $S_{83}$ 130-8. The row 450 includes subscriber $S_{63}$ 130-6, a Peer6 120-6 to which the subscriber $S_{63}$ 130-6 is registered, a slot value of two (2) on which the Peer6 120-6 received affiliation message from the subscriber $S_{63}$ 130-6, a talkgroup TgC 330 to which the subscriber $S_{63}$ 130-6 is affiliated, and a registration expiration time of 12:25:53 at which the registration will expire for the subscriber $S_{63}$ 130-6. The row 455 includes subscriber $S_{11}$ 130-1 whose information is filled as 'N/A' (not applicable) corresponding to columns 410, 415, 420, and 425. A row filled with 'N/A' corresponding to a given subscriber either indicates that subscriber's registration period has expired or the subscriber is powered off for a particular duration, or the subscriber is yet to send a Registration/Affiliation message to the Subscriber Steward 208.

Master Talkgroup Topology Database

FIG. 5 illustrates one example of structure 500 of the Master Talkgroup Topology Database 211 maintained by a Talkgroup Steward 210, for example TS(TgA) 315 residing within the Peer4 120-4 is shown. The masterTgTopology(Tg) table 211 is referred to as "setOfTablesToBackup" for Talkgroup Stewards acting as PRP. The masterTgTopology(Tg) table 211 contains the following columns (there is one row per subscriber): subscriberID column 505, peerToWhichSubscriberRegistered column 510, slotOnWhichAffiliationRxed column 515, and affiliationExpirationTime column 520. The subscriberID column 505 includes subscriber identification (subscriber ID) value that identifies a subscriber 130 associated with a given Talkgroup controlled by the Talkgroup Steward 210. The peerToWhichSubscriberRegistered column 510 includes Peer identification (Peer ID) value that identifies a Peer 120 to which the subscriber 130 has registered. The slotOnWhichAffiliationRxed column 515 includes a slot value that identifies a communication slot on which the Peer 120 has received the Registration/Affiliation message over the air from the subscriber 130. In one example, the communication slot is a time division multiplexing (TDM) slot, and the slot value is either one or two. The "affiliationExpirationTime" column 520 represents a time value occurring in the future at which the affiliation with the Talkgroup will expire for the subscriber 130.

As shown in FIG. 5, the masterTgTopology(TgA) table 211 maintained by Talkgroup Steward TS(TgA) of Talkgroup TgA includes a row 525 including subscriber $S_{15}$ 130-1, a Peer1 120-1 to which the subscriber $S_{15}$ 130-1 is registered, a slot value of one (1) on which the Peer1 120-1 received affiliation message from the subscriber $S_{15}$ 130-1, and an affiliation expiration time of 12:25:53 at which the affiliation will expire for the subscriber $S_{15}$ 130-1. The row 530 includes subscriber $S_{52}$ 130-5, a Peer5 120-5 to which the subscriber $S_{52}$ 130-5 is registered, a slot value of one (1) on which the Peer5 120-5 received affiliation message from the subscriber $S_{52}$ 130-5, and an affiliation expiration time of 12:30:08 at which the affiliation will expire for the subscriber $S_{52}$ 130-5. The row 535 includes subscriber $S_{34}$ 130-3, a Peer3 120-3 to which the subscriber $S_{34}$ 130-3 is registered, a slot value of one (1) on which the Peer3 120-3 received affiliation message from the subscriber $S_{34}$ 130-3, and an affiliation expiration time of 12:28:03 at which the affiliation will expire for the subscriber $S_{34}$ 130-3.

Operation of Subscriber Steward

Figure 6A:
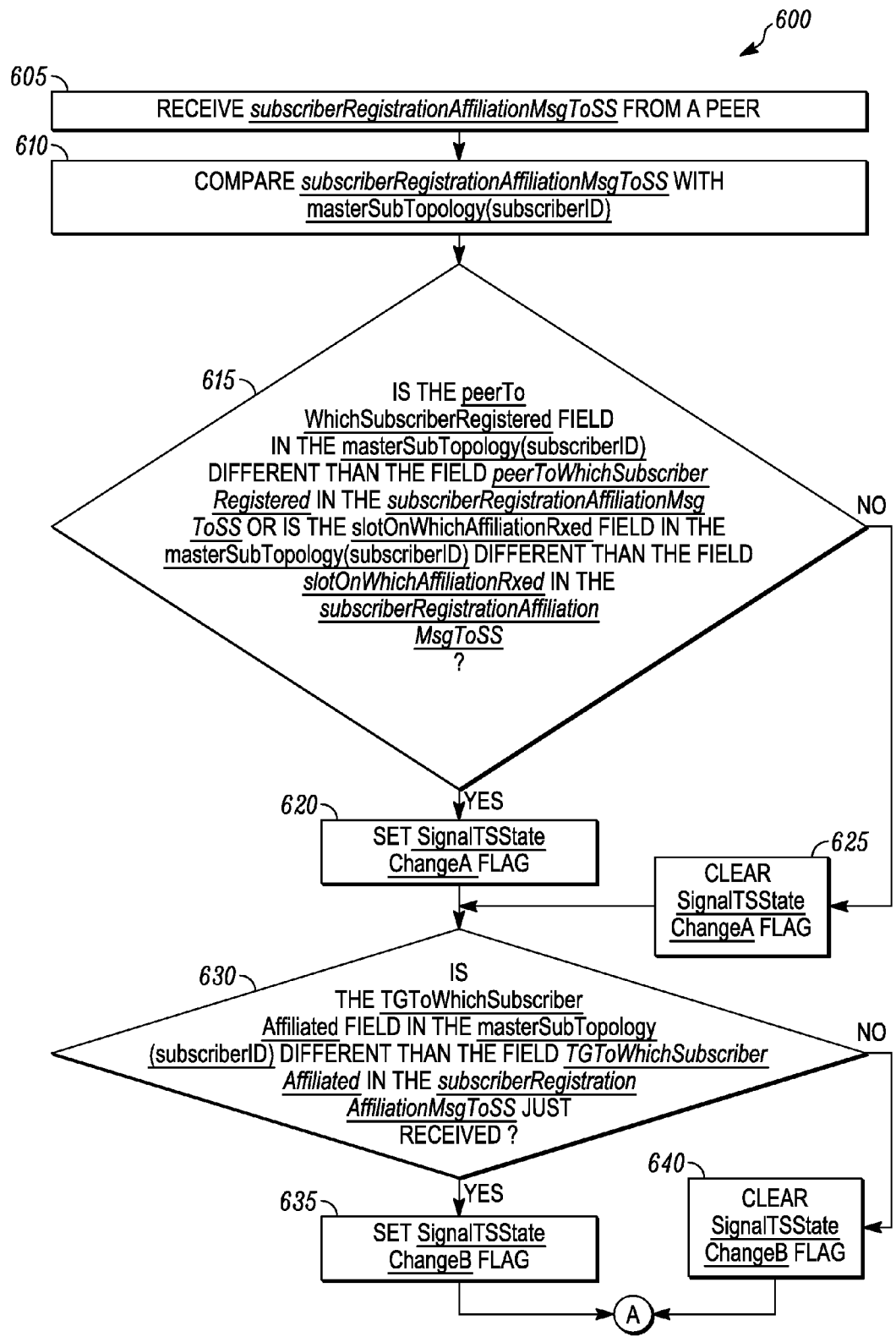
FIGS. 6A and 6B illustrate an example of operation performed by a Subscriber Steward in accordance with some embodiments.
Figure 6B:
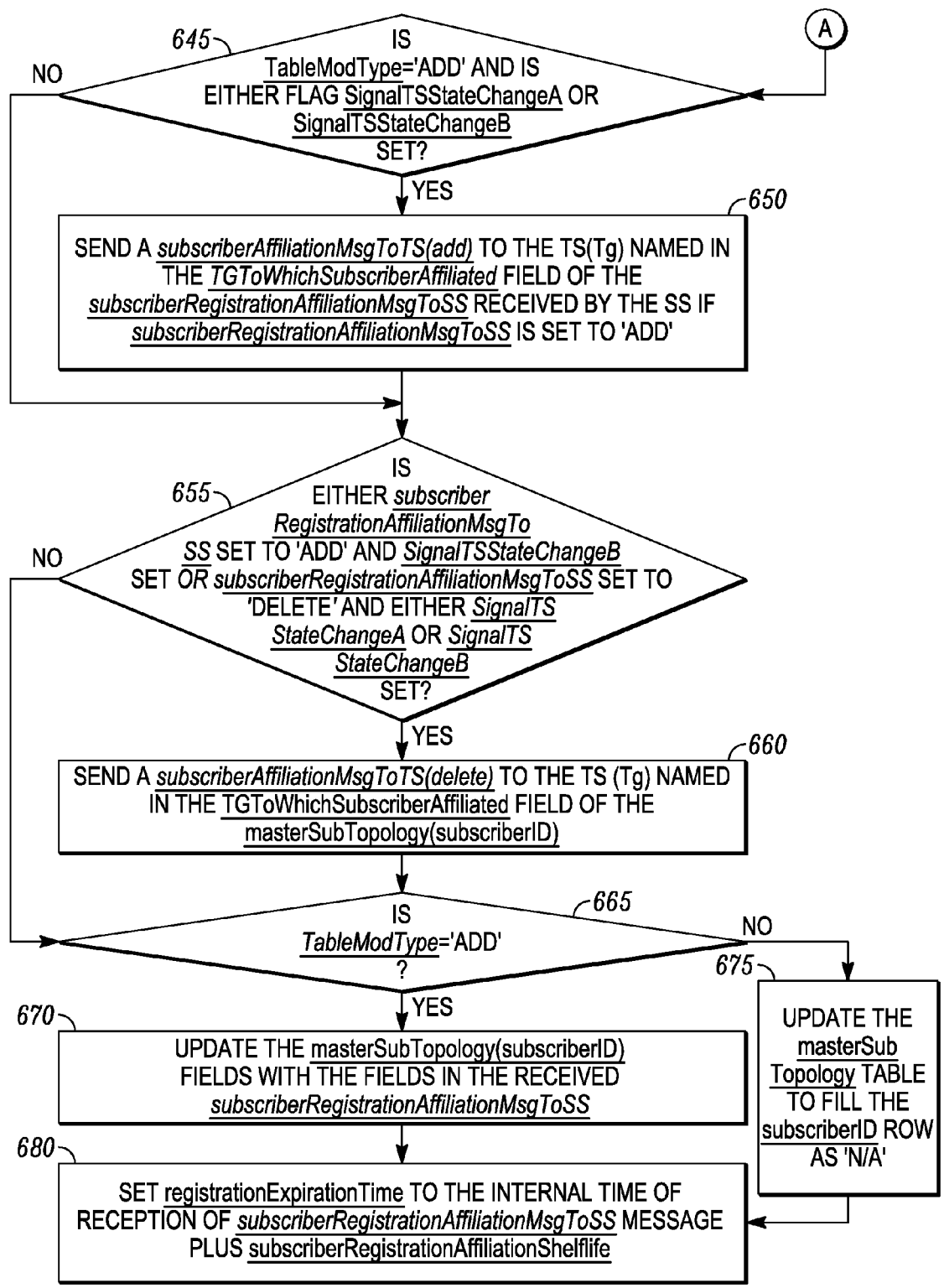

FIGS. 6A and 6B illustrate an example of operation 600 performed by Subscriber Steward 208. Note that FIG. 6A illustrates blocks 605 through 640 of the operation 600 and the same operation 600 is continued to blocks 645 through 680 in FIG. 6B. In other words, FIG. 6B illustrates the continuation of the operation 600 shown in FIG. 6A. At block 605, the Subscriber Steward 208 receives a signal subscriberRegistrationAffiliationMsgToSS (also referred to as subscriber registration affiliation message) from a Peer 120 which received a Registration/Affiliation Message from a subscriber 130. The Peer 120 which received the Registration/Affiliation Message OTA from the subscriber 130 sends a signal subscriberRegistrationAffiliationMsgToSS to the SS 208. In accordance with some embodiments, the signal subscriberRegistrationAffiliationMsgToSS contains subscriberID information that identifies the subscriber 130 (subscriber ID) uniquely, peerToWhichSubscriberRegistered information that identifies the Peer 120 (PeerID) which received the Registration/Affiliation Message OTA from the subscriber 130, slotOnWhichAffiliationRxed information that identifies the communication slot (e.g. TDM slot) on which the affiliation was received, TG information that identifies the talkgroup (TG) to which the subscriber desires to be affiliated, and tableModType information that identifies a type of update that needs to performed in the masterSubTopology table 209 maintained by the SS 208. TG includes a Talkgroup ID sent inbound over-the-air (OTA) in the subscriber Registration/Affiliation Message. The tableModType can be one of two values {add; delete}. If the Peer 120 received a Registration/Affiliation Message, the field is set to 'add'. If the Peer 120 received a "De-registration" message, this field is set to 'delete'. If the tableModType included in the subscriberRegistrationAffiliationMsgToSS is set to 'add', then the Subscriber Steward 208 updates the subscriberID's information in the masterSubTopology(subscriberID) with the information contained in the subscriberRegistrationAffiliationMsgToSS. Before doing this update, as shown in block 610, the Subscriber Steward 208 detects a change of state in the masterSubTopology(subscriberID), by comparing the information contained in the received subscriberRegistrationAffiliationMsgToSS with the corresponding information contained in the masterSubTopology(subscriberID). In other words, the Subscriber Steward 208 determines whether the peerToWhichSubscriberRegistered, TGToWhichSubscriberAffiliated, or slotOnWhichAffiliationRxed fields in the masterSubTopology (subscriberID) have a different value than the comparable fields in the subscriberRegistrationAffiliationMsgToSS. If the tableModType included in the subscriberRegistrationAffiliationMsgToSS is set to 'delete', then the Subscriber Steward 208 sets all of the fields in the masterSubTopology(subscriberID) to read as 'not applicable'. Before setting all of the fields to 'not applicable', the Subscriber Steward 208 detects a change of state, for example, the Subscriber Steward 208 determines whether the peerToWhichSubscriberRegistered, TGToWhichSubscriberAffiliated, or slotOnWhichAffiliationRxed fields in the masterSubTopology(subscriberID) will have a different value after being updated.

In accordance with some embodiments, as shown in block 615, the Subscriber Steward 208 determines whether the information peerToWhichSubscriberRegistered contained in the received subscriberRegistrationAffiliationMsgToSS signal is different than the peerToWhichSubscriberRegistered information contained in the masterSubTopology(subscriberID). Further, at block 615, the Subscriber Steward determines whether the slotOnWhichAffiliationRxed information contained in the subscriberRegistrationAffiliationMsgToSS signal is different than the slotOnWhichAffiliationRxed information contained in the masterSubTopology(subscriberID). If it is determined that either the peerToWhichSubscriberRegistered field or slotOnWhichAffiliationRxed field in the masterSubTopology(subscriberID) is different than the corresponding fields in the subscriberRegistrationAffiliationMsgToSS signal received by the Subscriber Steward 208, then as shown in block 620, the Subscriber Steward 208 determines that a first type of state change "SignalTSStateChangeA" has occurred to the masterSubTopology table and sets SignalTSStateChangeA flag. Returning to block 615, if both the peerToWhichSubscriberRegistered and slotOnWhichAffiliationRxed fields in the masterSubTopology(subscriberID) are same as the corresponding fields in the subscriberRegistrationAffiliationMsgToSS signal received by the Subscriber Steward 208, then the Subscriber Steward 208 determines that no state change has occurred upon receiving the subscriberRegistrationAffiliationMsgToSS signal and clears the SignalTSStateChangeA flag at block 625. Next, at block 630, the Subscriber Steward 208 determines whether TGToWhichSubscriberAffiliated field in the masterSubTopology(subscriberID) is different than the field TGToWhichSubscriberAffiliated in the subscriberRegistrationAffiliationMsgToSS signal received by the Subscriber Steward 208. If it is determined that the TGToWhichSubscriberAffiliated field in the masterSubTopology(subscriberID) is different than the field TGToWhichSubscriberAffiliated in the received subscriberRegistrationAffiliationMsgToSS signal, then the Subscriber Steward 208 detects that a second type of state change "SignalTSStateChangeB" has occurred in the masterSubTopology table and sets the SignalTSStateChangeB flag as shown in block 635. On the other hand, if the TGToWhichSubscriberAffiliated field in the masterSubTopology(subscriberID) is same as the field TGToWhichSubscriberAffiliated in the received subscriberRegistrationAffiliationMsgToSS signal, then the Subscriber Steward 208 clears the SignalTSStateChangeB flag at block 640.

Next, at block 645, the Subscriber Steward 208 determines if the tableModType in the signal subscriberRegistrationAffiliationMsgToSS is set to 'add' and either of the SignalTSStateChangeA flag or SignalTSStateChangeB flag is set. If the Subscriber Steward 208 determines that the tableModType in the signal subscriberRegistrationAffiliationMsgToSS is set to 'add' and at least one of the flags SignalTSStateChangeA or SignalTSStateChangeB is set, then at block 650, the Subscriber Steward 208 sends a subscriberAffiliationMsgToTS(add) (also referred to as subscriber affiliation message) to the TS(Tg) 210 named in the TGToWhichSubscriberAffiliated field of the subscriberRegistrationAffiliationMsgToSS signal received by the SS. In other words, the SS 208 sends a signal subscriberAffiliationMsgToTS(add) to the TS 210 when the tableModType was set to 'add' and either the state change SignalTSStateChangeA or the state change SignalTSStateChangeB has been detected. The fields in the subscriberAffiliationMsgToTS(add) are set to equivalent values in the subscriberRegistrationAffiliationMsgToSS as described in TABLE 1:

TABLE 1

| subscriberAffiliationMsgToTS(add) | subscriberRegistrationAffiliationMsgToSS(add) |
| --- | --- |
| subscriberID | subscriberID |
| peerToWhichSubscriberRegistered | peerToWhichSubscriberRegistered |
| slotOnWhichAffiliationRxed | slotOnWhichAffiliationRxed |
| TG | TGToWhichSubscriberAffiliated |
| tableModType | tableModType |

Returning to block 645, when the Subscriber Steward 208 determines that both the flags SignalTSStateChangeA and SignalTSStateChangeB are not set, or the tableModType was not set to 'add' in the subscriberRegistrationAffiliationMsgToSS, or upon completion of the processing in block 650, the Subscriber Steward 208 proceeds to block 655 to determine if either the signal subscriberRegistrationAffiliationMsgToSS is set to 'add' and the flag SignalTSStateChangeB is set, or the signal subscriberRegistrationAffiliationMsgToSS is set to 'delete' and either the flag SignalTSStateChangeA or the flag SignalTSStateChangeB is set. When the Subscriber Steward 208 determines that either the subscriberRegistrationAffiliationMsgToSS is set to 'add' and if SignalTSStateChangeB flag is set, or subscriberRegistrationAffiliationMsgToSS is set to 'delete' and if either SignalTSStateChangeA flag or SignalTSStateChangeB flag is set, then the Subscriber Steward 208 proceeds to block 660 to send a subscriberAffiliationMsgToTS(delete) to the TS(Tg) 210 named in the TGToWhichSubscriberAffiliated field of the masterSubTopology(subscriberID), for example, the signal is sent to the TS 210 logged in the masterSubTopology table 209 before the signal subscriberRegistrationAffiliationMsgToSS was received. In one embodiment, the subscriberAffiliationMsgToTS(delete) is sent to a Talkgroup Steward 210 controlling a talkgroup to indicate that a subscriber has de-affiliated from the talkgroup. The fields in the subscriberAffiliationMsgToTS(delete) are set to equivalent values in the row masterSubTopology(subscriberID) as illustrated in TABLE 2 and sent to TS(TGToWhichSubscriberAffiliated) 210.

TABLE 2

| subscriberAffiliationMsgToTS(delete) | masterSubTopology(subscriberID) |
|---|---|
| subscriberID peerToWhichSubscriberRegistered slotOnWhichAffiliationRxed TG tableModType | subscriberID peerToWhichSubscriberRegistered slotOnWhichAffiliationRxed TGToWhichSubscriberAffiliated N/A (SS sets the tableModType = delete) |

Next, at block 665, the SS 208 determines if the tableModType in the signal subscriberRegistrationAffiliationMsgToSS is set to 'add'. If the Subscriber Steward 208 determines that the tableModType in the signal subscriberRegistrationAffiliationMsgToSS is set to 'add', then the Subscriber Steward 208 proceeds to block 670 to update (set equal) the masterSubTopology(subscriberID) fields with the fields in the received subscriberRegistrationAffiliationMsgToSS signal. Otherwise, if the tableModType is set to 'delete' then, at block 675, the subscriberID row of the masterSubTopology table is filled with 'not applicable' (N/A) (except for the subscriberID field itself). Further, in accordance with some embodiments, when the SS 208 receives an subscriberRegistrationAffiliationMsgToSS(add), the SS 208 also sets (or resets if the row was already populated) the registrationExpirationTime to the internal time of reception of the subscriberRegistrationAffiliationMsgToSS plus subscriberRegistrationShelflife (as shown at block 680), where the subscriberRegistrationShelflife refers to the maximum time allowed before the row is deleted unless a refresh subscriberRegistrationAffiliationMsgToSS is received from the Peer 120 logged in the peerToWhichSubscriberRegistered field of the masterSubTopology(subscriberID). For example, the maximum time to go without a refresh can be set to twice the subscriberRegistrationAffiliationPeriod (the frequency at which registrations/affiliations come from the subscriber to the station). For example, when the subscriberRegistrationAffiliationPeriod is equal to fifteen (15) minutes, a refresh message needs to be received within thirty (30) minutes. In this case, the subscriberRegistrationShelflife is equal to thirty (30) minutes. In case, if the refresh message is not received within thirty (30) minutes, the subscriber's row in the masterSubTopology(subscriberID) may be set to N/A.

In accordance with some embodiments, when the registrationExpirationTime for any subscriberID expires, a signal subscriberAffiliationMsgToTS(delete) is generated. The signal subscriberAffiliationMsgToTS(delete) is sent to the Peer 120 whose peerID=TG field of the subscriberAffiliationMsgToTS(delete). Further, the subscriberID row of the masterSubTopology table is filled with 'N/A' (except for the subscriberID field itself).

In accordance with some embodiments, the Subscriber Steward 208 informs all other base stations 110 that it is the Steward for a particular subscriber 130. The Subscriber Steward 208 is only required to do this once as new base station 110 joins the P2P WAN 100. Therefore, if a private call is initiated, from a subscriber on some Peer, for example PeerX, only one message is communicated over the P2P WAN 100 to the subscriber's 130 specific Subscriber Steward 208 to find where a destination subscriber 130 is registered. In turn, the Subscriber Steward 208 responds with a message that indicate to which specific base station the subscriber 130 is registered. Now, PeerX knows to which one specific Peer to route the media. This is a scalable way with minimal messaging to locate mobile subscribers which can register at various base stations throughout the P2P WAN 100.

Operation of Talkgroup Steward

Figure 7:
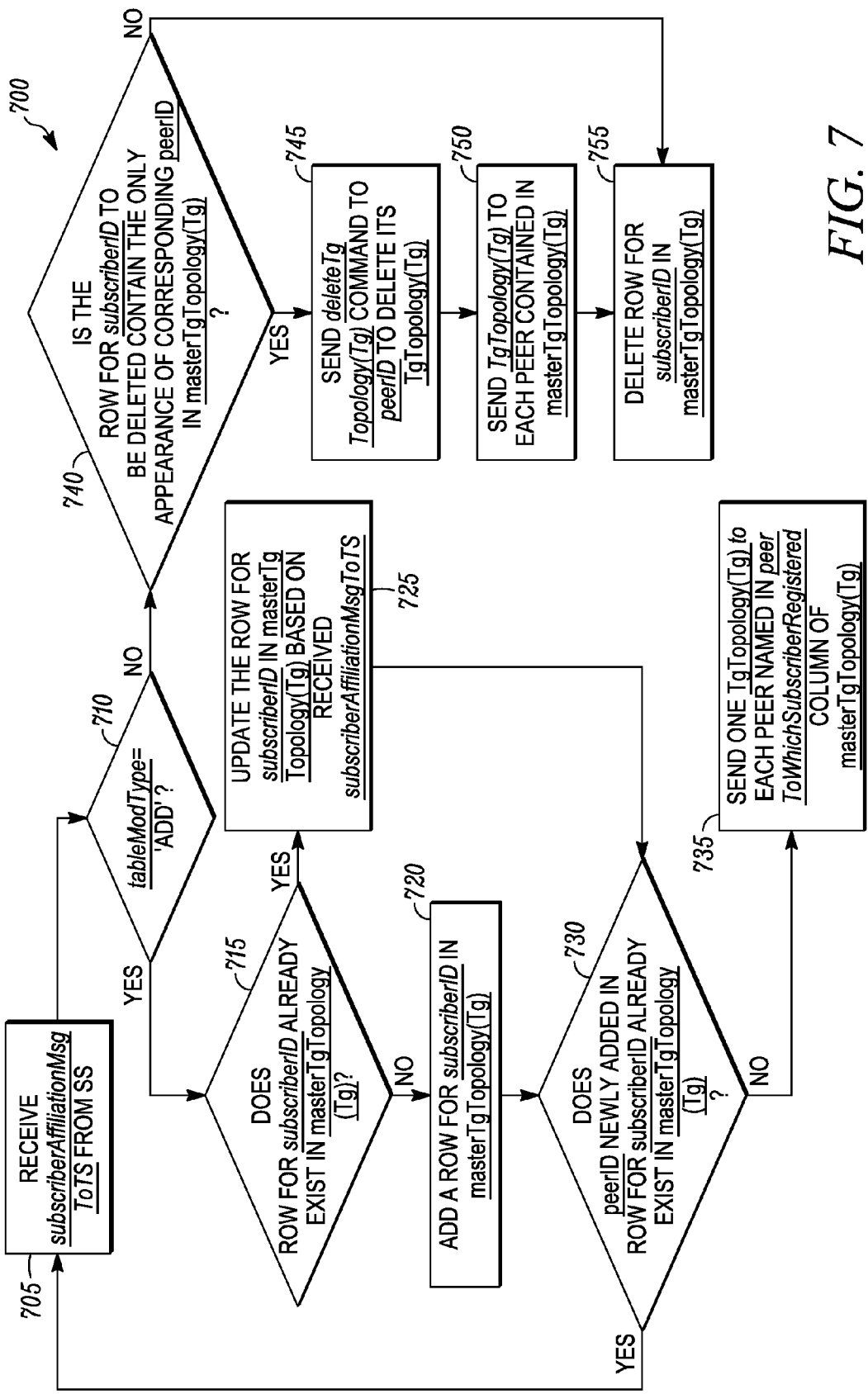
FIG. 7 illustrates an example of operation performed by a Talkgroup Steward in accordance with some embodiments.

FIG. 7 illustrates an example of operation 700 performed by Talkgroup Steward 210. The Talkgroup Steward 210 initiates its operation 700 when the Talkgroup Steward 210 receives subscriberAffiliationMsgToTS signal (also referred to as subscriber affiliation message) from a Subscriber Steward 208 at block 705. The subscriberAffiliationMsgToTS contains subscriberID information that identifies identification (subscriber ID) of the subscriber 130 uniquely, peerToWhichSubscriberRegistered that identifies the only one Peer (peerID) 120 to which the subscriber is registered, slotOnWhichAffiliationRxed that identifies the communication slot (e.g. TDM slot) on which the which the affiliation was received, where the value of TDM slot is either one or two, TG that identifies the talkgroup (TG) to which the subscriber will be affiliated or is no longer affiliated, where TG includes a Talkgroup ID sent inbound OTA in the subscriber affiliation message, tableModType that refers to a command from the SS to add or delete information corresponding to the subscriber from the given TG's masterTgTopology(Tg), where tableModType can be one of two values {add; delete}.

Next at block 710, the Talkgroup Steward 210 determines whether the received subscriberAffiliationMsgToTS includes a tableModType set to 'add'. When the received subscriberAffiliationMsgToTS includes a tableModType set to 'add', the TS 210 determines whether a row for subscriberID is already represented in the masterTgTopology(Tg) 211 as shown in block 715. If it is determined that the subscriberID isn't already represented in the masterTgTopology(Tg) 211, then at block 720, the TS 210 adds a row for that subscriberID in masterTgTopology(Tg) 211. On the other hand, if the subscriberID is already represented in the masterTgTopology(Tg) 211, then at block 725, the TS 210 updates the row for that subscriberID in masterTgTopology(Tg) 211 with the information contained in the received subscriberAffiliationMsgToTS signal.

Returning to block 710, when the received subscriberAffiliationMsgToTS includes a tableModType set to 'delete', the TS 210 assumes that the subscriberID is already represented in the masterTgTopology(Tg) 211 and deletes that row from the masterTgTopology(Tg) 211 for that subscriberID. In one example, the subscriber affiliation message subscriberAffiliationMsgToTS(delete) received by a Talkgroup Steward 210 controlling a talkgroup indicates that a subscriber has de-affiliated from the talkgroup.

In one embodiment, there is at most, one row in the masterTgTopology(Tg) 211 per subscriberID. In this embodiment, the TS 210 adds a row in the masterTgTopology(Tg) 211 for a given subscriber only if the TS 210 receives a subscriberAffiliationMsgToTS for the given subscriber and the tableModType is set to 'add' and the subscriberID didn't previously exist in the masterTgTopology(Tg) 211. If a row previously existed for a given subscriber, then the row is updated based on the previously received subscriberAffiliationMsgToTS signal pertaining to that subscriber. Further, regardless if a row for the subscriberID preexisted or not, the TS 210 also sets (or reset if the row already existed) the affiliationExpirationTime to the internal time of reception of the subscriberAffiliationMsgToTS plus subscriberAffiliationShelflife, where subscriberAffiliationShelflife refers to the maximum time allowed before a "TG Topology Delete Event" is triggered unless a refresh subscriberAffiliationMsgToTS is received from the SS 208. The "TG Topology Delete Event" causes the execution of the Talkgroup Steward 210 to start at the process which starts at block 740 where the subscriberID in block 740 is the subscriberID for the row whose affiliationExpirationTime has expired. For example, the maximum time to go without a refresh is set to twice the subscriberRegistrationAffiliationPeriod (the frequency at which registrations/affiliations come from the subscriber to the station). In one example, when the subscriberRegistrationAffiliationPeriod is equal to fifteen (15) minutes, a refresh signal needs to be received within thirty (30) minutes. In this case, the subscriberAffiliationShelflife is equal to thirty (30) minutes. In case, if the refresh message is not received within thirty (30) minutes, the "TG Topology Delete Event" at block 740 is triggered.

After adding a new row for that subscriberID in masterTgTopology(Tg) 211 as shown in block 720 or updating the corresponding row for that subscriberID in masterTgTopology(Tg) 211 as shown in block 725, the TS 210 proceeds to block 730, where the TS 210 determines whether the field peerToWhichSubscriberRegistered in the subscriberAffiliationMsgToTS signal is a peerID which doesn't currently exist in the masterTgTopology(Tg) 211. If it is determined that the peerID (call this peerID Peer2) doesn't currently exist in the masterTgTopology(Tg) 211, then at block 735, the TS 210 sends one talkgroup topology (TgTopology(Tg)) to each Peer 120 named in the peerToWhichSubscriberRegistered column of the masterTgTopology(Tg) 211 (including Peer2). In this case, the TgTopology(Tg) contains peerID Peer2.

Figures 8, 9:
FIG. 8 illustrates an example structure of a talkgroup topology table maintained by Talkgroup Steward in accordance with some embodiments.
FIG. 9 illustrates an updated master talkgroup topology database in accordance with some embodiments.

Referring to FIG. 8, one example of a structure and content of TgTopology(Tg) table 800 is shown. The TgTopology(Tg) table 800 includes an identification for the given talkgroup, a first column 810 for listing all of the destination peerID's and a second column 820 for listing all the slot numbers to which communication data (e.g. audio) must be routed on the communication network 125 when any given Peer 120 (e.g., base station 110) receives inbound communication data from a subscriber 130 whose destination is the given talkgroup. Once a Peer 120 has the TgTopology(Tg) table 800, the Peer 120 can packet duplicate the communication data (audio) and route the communication data only to the necessary base stations 110 that must transmit communication data for the given destination talkgroup. The TgTopology(Tg) table 800 is basically a table of the stations and slot numbers upon which a talkgroup affiliation was received. Therefore, these are the stations and slots on which communication data needs to be transmitted so that a subscriber 130 can receive the communication data associated with the given talkgroup. In accordance with some embodiments, there is only one appearance of any one peerID/slot pair on the TgTopology (Tg) table 800.

For example, when the TS 210 (Peer4 120-4) receives a subscriberAffiliationMsgToTS signal including subscriberID $S_{25}$ 130-2, Peer2 120-2 to which the subscriber $S_{25}$ 130-2 is registered, a slot value of two (2) on which the Peer2 120-2 received affiliation message from the subscriber $S_{25}$ 130-2, and an affiliation expiration time of 12:35:24 at which the affiliation will expire for the subscriber $S_{25}$ 130-2, the TS 210 (Peer4 120-4) determines that Peer 2 120-2 doesn't currently exist in the masterTgTopology(Tg) table 211, and therefore generates a TgTopology(TgA) table 800 including a new row for Peer 2 120-2 and the corresponding slot information. The generated TgTopology(TgA) table 800, for example, includes a row 830 including Peer1 120-1 and a slot value of one (1), a row 840 including Peer5 120-5 and a slot value of one (1), row 850 including Peer3 120-3 and a slot value of one (1), and a new row 860 including Peer2 120-2 and a slot value of two (2). The generated TgTopology(TgA) is then sent to each peer 120 in the peerToWhichSubscriberRegistered column (Peer 1 120-1, Peer5 120-5, Peer3 120-3) of the masterTgTopology (TgA) table 211 (including Peer2 120-2).

Now returning to block 710 of FIG. 7, when the TS 210 determines that the received subscriberAffiliationMsgToTS includes a tableModType set to 'delete', then at block 740, the TS 210 determines whether the row for subscriberID to be deleted contained the only appearance of peerID_x (considering that the peerToWhichSubscriberRegistered field in the subscriberAffiliationMsgToTS contains a peerID string "peerID_x") in the peerToWhichSubscriberRegistered column of the masterTgTopology(Tg) 211. If the TS 210 determines that the row to be deleted contained the only appearance of peerID_x, then at block 745, the TS sends an explicit command called deleteTgTopology(Tg) to peerID_x to delete its TgTopology(Tg) 800 where the Tg field specifies the talkgroup. If the TS 210 determines that the row to be deleted contained the second or more appearance of peerID_x, then processing continues to block 755. For example, if peerID_x is still referencing a TgTopology(Tg) table 800 that was not yet deleted, and further if the peerID_x receives an inbound communication data from a subscriber 130 for a given talkgroup, then the peerID_x routes the inbound communication data to other Peers 120 that are listed in the TgTopology(Tg). In this case, the base stations 110 associated with the Peers 120 listed in the TgTopology(Tg) receive the communication data from peerID_x and transmit outbound the communication data they received from peerID_x. Other subscribers 130 hear and respond except their Peers 120 do not route the response communication data back to peerID_x because peerID_x is not on their TgTopology(Tg) 800. This use case may confuse users and therefore an explicit command is needed to be sent to peerID_x to delete its TgTopology(Tg) table 800. In this case, if there is communication data destined for the given talkgroup, it should no longer be routed to peerID_x. Therefore, the TS 210 further sends one TgTopology(Tg) to each Peer 120 named in the peerToWhichSubscriberRegistered column of the masterTgTopology(Tg) as shown in block 750, such that both the masterTgTopology(Tg) 211 and TgTopology(Tg) 800 no longer contain peerID_x.

Next at block 755, the TS 210 deletes the row in the masterTgTopology(Tg) 211 for the particular subscriberID in the subscriberAffiliationMsgToTS (assuming a row in the masterTgTopology(Tg) already exists for the particular subscriberID). In accordance with some embodiments, this "deletion" event is not only triggered by the signal subscriberAffiliationMsgToTS with the tableModType set to 'delete', but also if the affiliationExpirationTime expires without a refresh to keep the row alive in the masterTgTopology(Tg) table 211.

For example, referring to FIG. 5, consider that subscriber $S_{34}$ changed its talkgroup affiliation from Talkgroup TgA to some other talkgroup approximately one hour later and other subscribers ($S_{15}$, $S_{52}$) did not roam from their stations (e.g., Peers 1 and 5, respectively) and sent in their registrations/affiliations in a timely fashion to preserve state in the TS 210. Further, consider that the signal subscriberAffiliationMsgToTS was received by TS 210 of TgA, for example, Peer4 120-4 at 13:08:33 local time on the TS 210 including information subscriberID $S_{34}$ 130-3, Peer3 120-3 to which the subscriber $S_{34}$ 130-3 is registered, a slot value of one (1) on which the Peer3 120-3 received affiliation message from the subscriber $S_{34}$ 130-3, talkgroup TG of TgA, and tableMod- Type set to 'delete'. In this case, the masterTgTopology(TgA) table 211 shown in FIG. 5 would be modified to reflect the "delete" operation as depicted in FIG. 9. In other words, FIG. 9 shows the content of masterTgTopology(Tg) table 211 excluding the row corresponding to the subscriber $S_{34}$ 130-3. Further, since this was the last appearance of Peer3 120-3 in the masterTgTopology(TgA) 211, a TgTopology(TgA) 800 is sent to each Peer 120 named in the masterTgTopology(TgA) 211. The resulting TgTopology(TgA) is sent to Peer1 120-1 and Peer5 120-5. Also a TgTopology(TgA) is sent to Peer3 120-3.

Signal Flows Between Entities of Peer-to-Peer Wide Area Network

Figure 10:
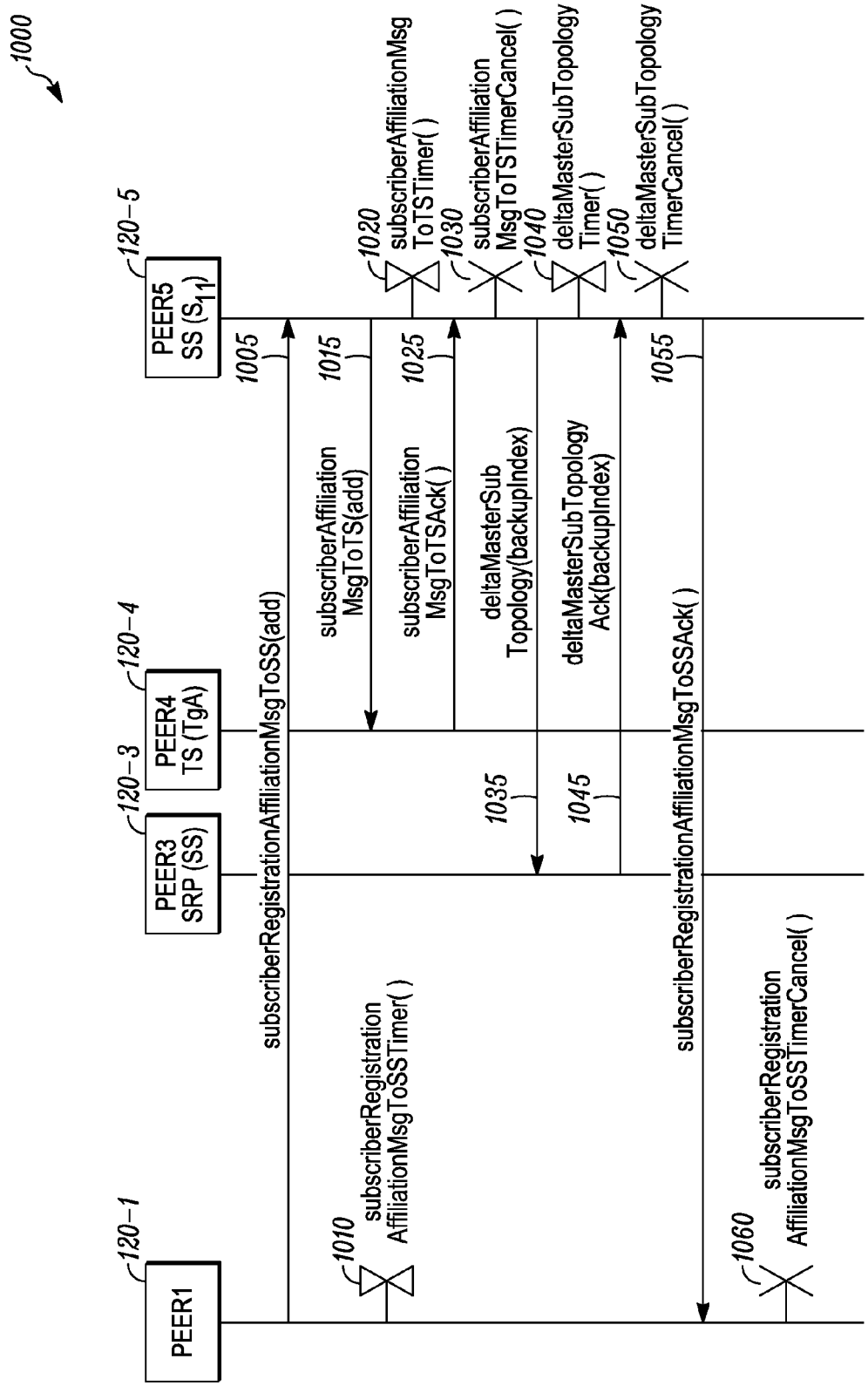
FIG. 10 is a signal flow diagram illustrating signal flows between different entities of a peer-to-peer wide area network when a subscriber 130 "registering/affiliating" with a Peer in accordance with some embodiments.

FIG. 10 is a signal flow diagram 1000 illustrating signal flows between different entities of peer-to-peer wide area network 100 when a subscriber 130 "registering/affiliating" with a Peer 120. In accordance with some embodiments, the subscriber 130 may "register/affiliate" with a Peer 120 either after powering up within a system or moving from a coverage area of one Peer to another Peer while keeping a same talkgroup affiliation. For example, when a subscriber $S_{11}$ 130-1 powers on in the coverage area of the network location 105-1 served by the base station 105-1, the Peer1 120-1 residing within the base station 110-1 identifies the Subscriber Steward 208 (Peer5 120-5) of the subscriber $S_{11}$ 130-1, and sends a subscriberRegistrationAffiliationMsgToSS(add) signal 1005 to the Subscriber Steward 208 of the subscriber $S_{11}$ 130-1 residing within the Peer5 120-5. In this case, the signal subscriberRegistrationAffiliationMsgToSS(add) includes information such as subscriberID=$S_{11}$, peerToWhichSubscriberRegistered=Peer1, slotOnWhichAffiliationRxed=1, TG=TgA, and tableModType=add. After sending the 1005 signal, the Peer1 120-1 initiates a timer "subscriberRegistrationAffiliationMsgToSSTimer( )" 1010. The timer 1010 specifies a predefined time period within which the Peer1 120-1 expects a response to the signal 1005. If the predefined time period lapses, the Peer1 120-1 retries sending the signal 1005 to the Subscriber Steward Peer5 120-5. In accordance with some embodiments, the number of retries for sending the signal 1005 is predefined.

When the Subscriber Steward 208 residing within Peer5 120-5 receives the signal 1005, the Subscriber Steward 208 residing within Peer5 120-5 sends a subscriberAffiliationMsgToTS(add) signal 1015 to the Talkgroup Steward 210 controlling a talkgroup TgA with which the subscriber $S_{11}$ 130-1 is affiliated. In this example, the Talkgroup Steward controlling the talkgroup TgA resides within the Peer4 120-4. After sending the 1015 signal, the Peer5 120-5 initiates a timer "subscriberAffiliationMsgToTSTimer( )" 1020. The timer 1020 specifies a predefined time period within which the Peer5 120-5 expects a response to the signal 1015. If the predefined time period lapses, the Peer5 120-5 again initiates sending the signal 1015 to the Talkgroup Steward 210 residing within Peer4 120-4. When the Talkgroup Steward 210 residing within Peer4 120-4 receives the subscriberAffiliationMsgToTS(add) signal 1015, the Peer4 120-4 sends an acknowledgment subscriberAffliationMsgToTSAck( ) signal 1025 to the Subscriber Steward 208 residing within Peer5 120-5. After receiving the acknowledgment signal 1025 from the Talkgroup Steward 210 residing within Peer4 120-4, the Subscriber Steward 208 residing within Peer5 120-5 cancels the initiated timer 1020 by issuing "subscriberAffiliationMsgToTSTimerCancel( )" 1030.

The Subscriber Steward 208 then updates its masterSubTopology table 209 shown in FIG. 4 to include information related to subscriber $S_{11}$ 130-1 corresponding to the row 1100 of masterSubTopology table 209 as shown in FIG. 11. In accordance with some embodiments, the new masterSubTopology table contains only one additional row corresponding to the new registration and affiliation for subscriber $S_{11}$ 130-1. A signal deltaMasterSubTopology(backupindex) 1035 including only this row which has the new registration and affiliation of subscriber $S_{11}$ 130-1 in the masterSubTopology is sent by Peer5 120-5 to the Subscriber Steward 208 residing within Peer3 120-3 which acts as a secondary role provider (SRP). The variable backupindex is a large integer (e.g. 48 bits or more) that represents the "$n^{th}$" alteration to the masterSubTopology table. As used herein, it is to be understood that a signal defined as "deltaMasterSubTopology(backupindex)", in embodiments of the disclosure, implies a signal which carries a difference in information between an updated version of the masterSubTopology table 209 maintained by a Subscriber Steward 208 acting as an PRP and a version of the masterSubTopology maintained by another Subscriber Steward acting as an SRP. The SRP can act as a Subscriber Steward 208 or a secondary role provider (SRP) if the primary Subscriber Steward (Peer5) fails. Upon receiving the deltaMasterSubTopology (backupindex) the SRP updates its own copy of the masterSubTopology, which is termed as the backupMasterSubTopology table, to match Peer5's copy of the masterSubTopology. In this example, the backup Subscriber Steward resides within the Peer3 120-3. Subsequently, the Subscriber Steward 208 residing within Peer5 120-5 initiates a timer "deltaMasterSubTopologyTimer( )" 1040 which defines a time period within which the Subscriber Steward 208 expects an acknowledgment from the backup Subscriber Steward residing within Peer3 120-3. The backup Subscriber Steward residing within Peer3 130-3, after updating the backupMasterSubTopology table to match the Subscriber Steward Peer5's masterSubTopology table, sends an acknowledgment deltaMasterSubTopologyAck(backupindex) 1045 to the Subscriber Steward 208 residing within Peer5 120-5. Upon receiving the acknowledgment deltaMasterSubTopologyAck (backupindex) 1045, the Subscriber Steward 208 residing within Peer5 120-5 cancels the timer 1040 by issuing "deltaMasterSubTopologyTimerCancel( )" 1050, and sends a subscriberReistrationAffiliationMsgToSSAck( ) signal 1055 to the Peer1 120-1. The Peer120-1 then cancels the timer 1010 by issuing "subscriberRegistrationAffiliationMsgToSSTimerCancel( )" 1060.

Figure 12:
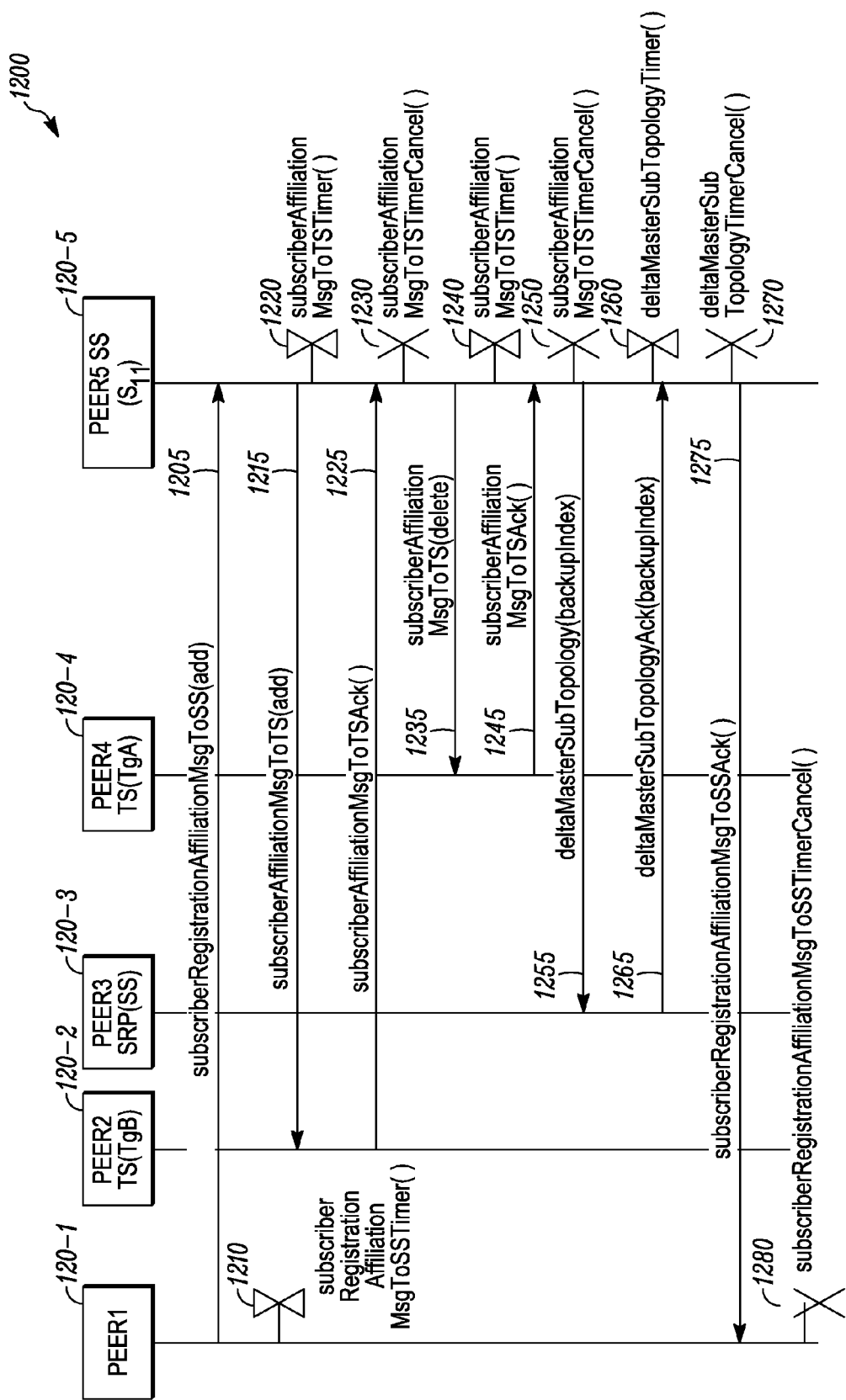
FIG. 12 is a signal flow diagram illustrating signal flows between different entities of a peer-to-peer wide area network when a subscriber changes a talkgroup affiliation from one talkgroup to another talkgroup in accordance with some embodiments.

FIG. 12 is a signal flow diagram 1200 illustrating signal flows between different entities of a peer-to-peer wide area network 100 when a subscriber 130 changes a talkgroup affiliation from one talkgroup to another talkgroup. When a subscriber $S_{11}$ 130-1 (listed in masterSubTopology table 209 shown in FIG. 11) has changed the talkgroup to which it is affiliated from TgA to TgB, the Subscriber Steward 208 residing within Peer5 120-5, in accordance with some embodiments, signals the Talkgroup Steward of TgA that subscriber $S_{11}$ 130-1 is no longer affiliated to TgA and then signal the TS(TgB) that subscriber $S_{11}$ 130-1 is affiliated to TgB. When the subscriber $S_{11}$ 130-1 changes affiliation from TgA to TgB, the Subscriber $S_{11}$ initially signals the peer 120 to which it is registered, for example, Peer1 120-1, a Registration/Affiliation Message including information related to its subscriberID and new talkgroup identification (TgB). The Peer1 120-1 then sends a signal subscriberRegistrationAffiliationMsgToSS 1205 to Subscriber Steward 208 residing in Peer5 120-5. In this case, the signal subscriberRegistrationAffiliationMsgToSS 1205 includes information such as subscriberID=$S_{11}$, peerToWhichSubscriberRegistered=Peer1, slotOnWhichAffiliationRxed=1, TG=TgB, and tableModType=add. Subsequently, the Peer1 120-1 initiates a timer "subscriberRegistrationAffiliationMsgToSSTimer( )" 1210. The timer 1210 specifies a predefined time period within which the Peer1 120-1 expects a response to the signal 1205. If the predefined time period lapses, the Peer1 120-1 retries sending the signal 1205 to the Subscriber Steward 208 residing within Peer5 120-5. In accordance with some embodiments, the number of retries for sending the signal 1205 is predefined.

When the Subscriber Steward 208 residing within Peer5 120-5 receives the subscriberRegistrationAffiliationMsgToSS signal 1205, the Subscriber Steward 208 residing within Peer5 120-5 generates a signal subscriberAffiliationMsgToTS(add) 1215 and sends the generated signal 1215 to Talkgroup Steward 210 residing within Peer2 120-2 that controls the talkgroup TgB. The subscriberAffiliationMsgToTS signal 1215 includes information such as subscriberID=$S_{11}$, peerToWhichSubscriberRegistered=Peer1, slotOnWhichAffiliationRxed=1, TG=TgB, and tableModType=add. The Peer5 120-5 then initiates a timer "subscriberAffiliationMsgToTSTimer( )" 1220. The timer 1220 specifies a predefined time period within which the Peer5 120-5 expects a response to the signal 1215. If the predefined time period lapses, the Peer5 120-5 again sends the signal 1215 to the Talkgroup Steward 210 residing within Peer2 120-2 of TgB. The Peer2 120-2 then sends a subscriberAffiliationToTSAck( ) signal 1225 to the Subscriber Steward 208 residing within Peer5 120-5. Upon receiving this signal 1225, the Peer5 120-5 cancels the timer 1220 by issuing "subscriberAffiliationMsgToTSTimerCancel( )" 1230.

A signal subscriberAffiliationMsgToTS(delete) 1235 is also generated and sent to Talkgroup Steward 210 residing within Peer4 120-4 that controls the talkgroup TgA. The signal subscriberAffiliationMsgToTS 1235 includes information such as subscriberID=$S_{11}$, peerToWhichSubscriberRegistered=Peer1, slotOnWhichAffiliationRxed=1, TG=TgA, and tableModType=delete. The Peer5 120-5 then initiates a timer "subscriberAffiliationMsgToTSTimer( )" 1240 which defines a time period within which the Peer5 120-5 expects an acknowledgment from Peer4 120-4. Further, the masterSubTopology table 209 (maintained by the Subscriber Steward 208 residing within Peer5 120-5) shown in FIG. 11 is also updated to reflect the change of affiliation of TgA to TgB corresponding to a row 1300 of subscriber $S_{11}$ 120-1 as shown in FIG. 13. When the Subscriber Steward 208 receives the acknowledgment subscriberAffiliationMsgToTSAck( ) 1245 from the Peer4 120-4, the Subscriber Steward 208 residing within Peer5 120-5 cancels the timer 1240 by issuing a signal "subscriberAffiliationMsgToTSTimerCancel( )" 1250.

When the Subscriber Steward 208 residing within Peer5 120-5 receives the acknowledgment from the Talkgroup Steward 210 residing within Peer2 120-2 of TgB, the Subscriber Steward 208 residing within Peer5 120-5 generates a backup of masterSubTopology 209 for subscriber $S_{11}$ 130-1 to reflect the change of affiliation of TgA to TgB. In accordance with some embodiments, the new masterSubTopology table contains only one altered row corresponding to the change of affiliation for subscriber $S_{11}$ 130-1. A signal deltaMasterSubTopology(backupindex) 1255 including only the altered row of the masterSubTopology which has the change of affiliation for subscriber $S_{11}$ 130-1 is sent to the Subscriber Steward 208 residing within Peer3 120-3 which acts as a secondary role provider (SRP). The variable backupindex is a large integer (e.g. 48 bits or more) that represents the "$n^{th}$" alteration to the masterSubTopology table. Upon receiving the deltaMasterSubTopology(backupindex), the SRP updates its own copy of the masterSubTopology, which is termed as the backupMasterSubTopology table, to match Peer5's copy of the masterSubTopology. Further, the Peer5 120-5 initiates a timer "deltaMasterSubTopologyTimer( )" 1260 which defines a time period within which the Peer5 120-5 expects an acknowledgment from Peer3 130-3. The Peer3 120-3 sends the acknowledgement after updating the backupMasterSubTopology table to match the Subscriber Steward Peer5's masterSubTopology table. When the Peer5 120-5 receives the acknowledgment deltaMasterSubTopologyTimerAck(backupindex) 1265, the Peer5 120-5 cancels the timer 1260 by issuing a signal "deltaMasterSubTopologyTimerCancel( )" 1270. Finally, the Peer5 120-5 sends a subscriberRegistrationAffiliationMsgToSSAck( ) signal 1275 to Peer1 120-1 with which the subscriber $S_{11}$ is registered. The Peer1 120-1 then cancels the timer 1210 by issuing a signal "subscriberRegistrationAffiliationMsgToSSTimerCancel( )" 1280.

Figure 14:
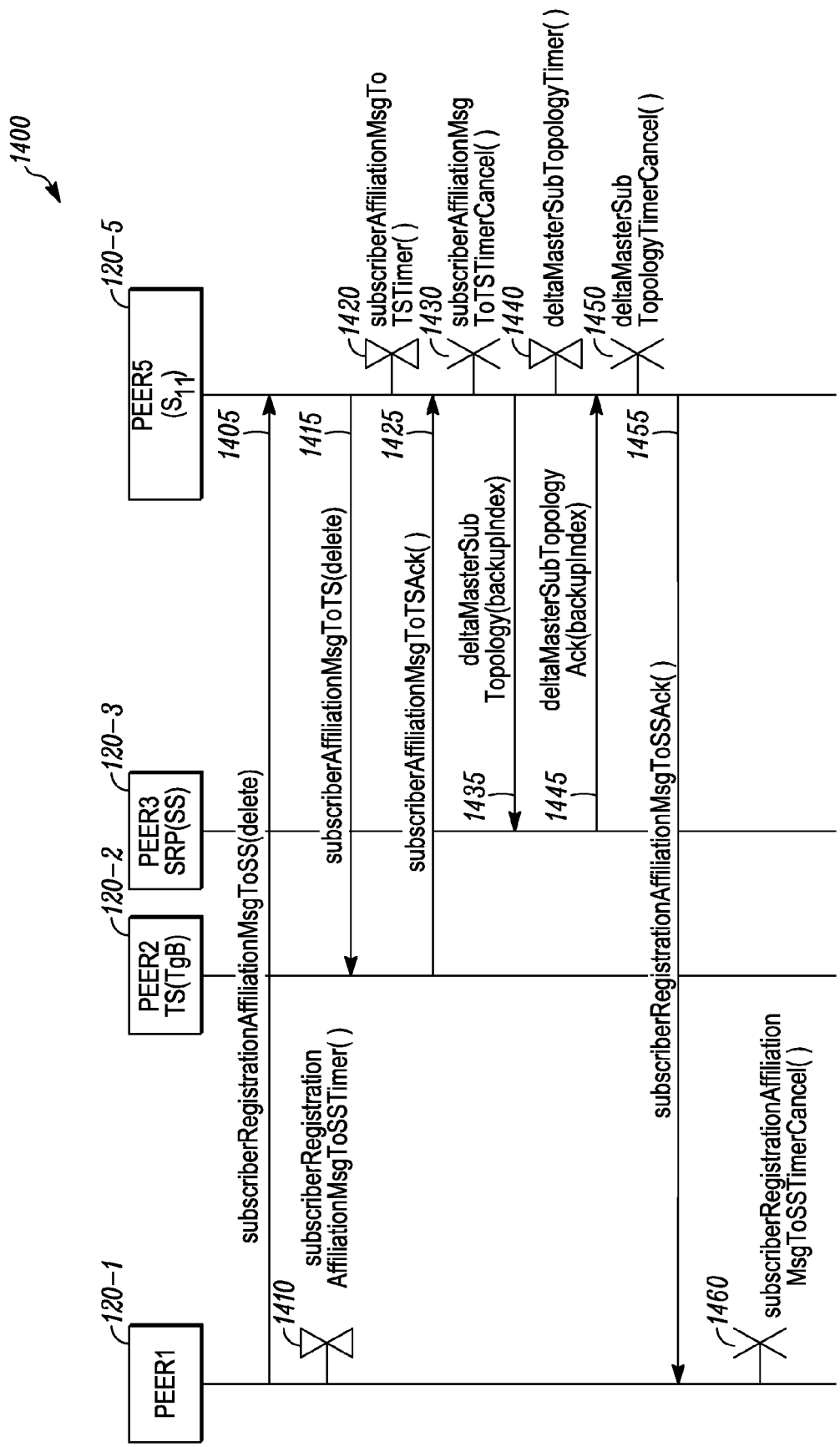
FIG. 14 is a signal flow diagram illustrating signal flows between different entities of a peer-to-peer wide area network when a subscriber powers down in accordance with some embodiments.

FIG. 14 is a signal flow diagram 1400 illustrating signal flows between different entities of a peer-to-peer wide area network 100 when a subscriber 130 powers down or drives out of range from a base station 110 with which it is currently associated or when the registrationExpirationTime in the Subscriber Steward's masterSubTopology 209 for the subscriber 130 expires. In the example shown in FIG. 14, consider that the Peer1 120-1 with which the subscriber $S_{11}$ is registered detects that the subscriber $S_{11}$ 130-1 has either powered down or has driven out of range of its associated base station 110-1. In one embodiment, this detection can be performed based on either an explicit "de-registration" message received from the subscriber $S_{11}$ or based on a timer in Peer1 120-1. Upon detection, the Peer1 120-1 sends a subscriberRegistrationAffiliationMsgToSS(delete) signal 1405 to the Subscriber Steward 208 residing within Peer5 120-1 of subscriber $S_{11}$ 130-1. The signal subscriberRegistrationAffiliationMsgToSS(delete) 1405 includes information such as subscriberID=$S_{11}$, peerToWhichSubscriberRegistered=Peer1, slotOnWhichAffiliationRxed=1, TG=TgB, and tableModType=delete. Subsequently, the Peer1 120-1 initiates a timer "subscriberRegistrationAffiliationMsgToSSTimer( )" 1410. The timer 1410 specifies a predefined time period within which the Peer1 120-1 expects a response to the signal 1405. If the predefined time period lapses, the Peer1 120-1 retries sending the signal 1405 to the Subscriber Steward 208 residing within Peer5 120-5. In accordance with some embodiments, the number of retries for sending the signal 1405 is predefined.

When the Subscriber Steward 208 residing within Peer5 120-5 receives the subscriberRegistrationAffiliationMsgToSS(delete) signal 1405, the Subscriber Steward 208 generates a signal subscriberAffiliationMsgToTS(delete) 1415 and sends the generated signal 1415 to Talkgroup Steward 210 residing within Peer2 120-2 of TgB. The subscriberAffiliationMsgToTS(delete) signal 1415 includes information such as subscriberID=$S_{11}$, peerToWhichSubscriberRegistered=Peer1, slotOnWhichAffiliationRxed=1, TG=TgB, and tableModType=delete. The Peer5 120-5 then initiates a timer "subscriberAffiliationMsgToTSTimer( )" 1420. The timer 1420 specifies a predefined time period within which the Peer5 120-5 expects a response to the signal 1415. If the predefined time period lapses, the Peer5 120-5 again sends the signal 1415 to the Talkgroup Steward 210 residing within Peer2 120-2 of TgB. The Peer2 120-2, after processing the subscriberAffiliationMsgToTS(delete) signal 1415 sends a subscriberAffiliationMsgToTSAck( ) signal 1425 to the Subscriber Steward 208 residing within Peer5 120-5. Upon receiving the signal 1425, the Peer5 120-5 cancels the timer 1420 by issuing a signal "subscriberAffiliationMsgToTSTimerCancel( )" 1430. Further, the Subscriber Steward 208 residing within Peer5 120-5 updates its masterSubTopology 209 shown in FIG. 13 to reflect a change in talkgroup affiliation and also updates a row of the masterSubTopology table 1500 corresponding to the subscriber $S_{11}$ as 'N/A' as shown in FIG. 15.

The Subscriber Steward 208 then sends a deltaMasterSubTopology(backupindex) signal 1435 to another Subscriber Steward acting as a secondary role provider (SRP) which updates its local copy of the masterSubTopology table, which is termed as backupMasterSubTopology table The deltaMasterSubTopology(backupindex) signal 1435 contains only the updated row of the masterSubTopology table which concerns subscriber $S_{11}$. The variable backupindex is a large integer (e.g. 48 bits or more) that represents the "$n^{th}$" alteration to the masterSubTopology table. In this example, the backup Subscriber Steward resides within the Peer3 120-3. Subsequently, the Subscriber Steward 208 residing within Peer5 120-5 initiates a timer "deltaMasterSubTopologyTimer( )" 1440 which defines a time period within which the Subscriber Steward 208 expects an acknowledgment from the backup Subscriber Steward residing within Peer3 120-3. The backup Subscriber Steward residing within Peer3 130-3, after updating the backupMasterSubTopology table to match the masterSubTopology table maintained by the Subscriber Steward 208 residing at Peer5 120-5, sends an acknowledgment deltaMasterSubTopologyAck(backupindex) 1445 to the Subscriber Steward 208 residing within Peer5 120-5. Upon receiving the acknowledgment deltaMasterSubTopologyAck(backupindex) 1445, the Subscriber Steward 208 residing at Peer5 120-5 cancels the timer by issuing a signal "deltaMasterSubTopologyTimerCancel( )" 1450, and sends a subscriberRegistrationAffiliationMsgToSSAck( ) signal 1455 to the Peer1 120-1. The Peer1 120-1 then cancels the timer 1410 by issuing a signal "subscriberRegistrationAffiliationMsgToSSTimerCancel( )" 1460.

In accordance with some embodiments, the deletion event depicted in FIG. 14 is triggered in the Subscriber Steward 208 residing within Peer5 120-5 by not only receiving the signal subscriberRegistrationAffiliationMsgToSS 1405 with the tableModType set to 'delete' but also if the registrationExpirationTime in the masterSubTopology table 209 for subscriber $S_{11}$ 130-1 expires. In one example, the registrationExpirationTime expires if a subscriberRegistrationAffiliationMsgToSS(add) is not received by the Subscriber Steward 208 residing within Peer5 120-5 of subscriber $S_{11}$ 130-1 before the local time on the Subscriber Steward 208 residing within Peer5 120-5 exceeds 12:38:43. After expiry of registrationExpirationTime of the subscriber $S_{11}$ 130-1, the Subscriber Steward 208 updates its masterSubTopology table 1500 as depicted in FIG. 15.

Figure 16:
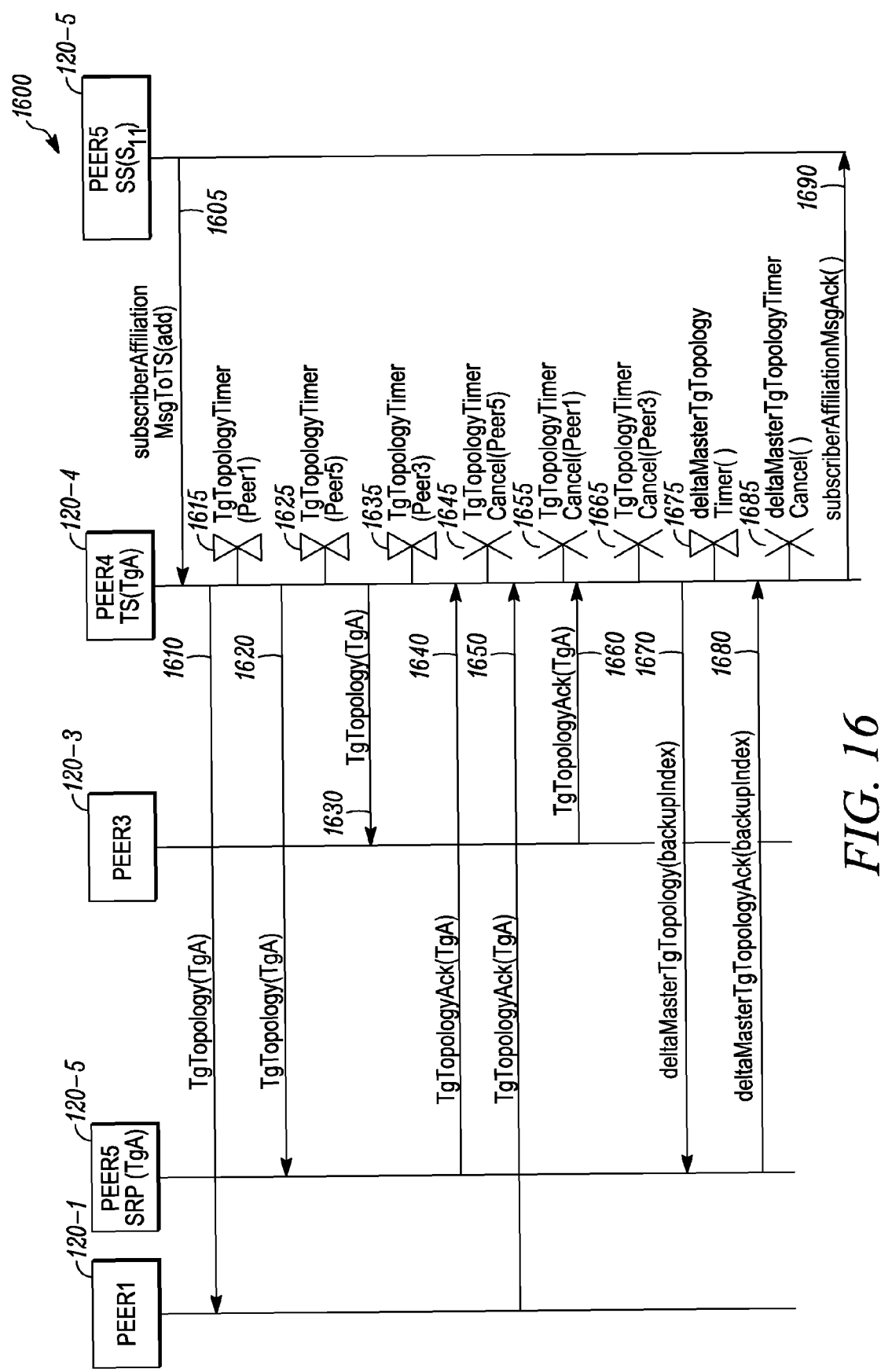
FIG. 16 is a signal flow diagram illustrating signal flows between different entities of a peer-to-peer wide area network when a subscriber roams to a base station and affiliates to a talkgroup in accordance with some embodiments.

FIG. 16 is a signal flow diagram 1600 illustrating signal flows between different entities of a peer-to-peer wide area network 100 when a subscriber 130 roams to a base station and affiliates to a talkgroup. In the example shown in FIG. 16, consider that a subscriber $S_{11}$ 130-1 has roamed to Peer1 120-1 residing within a base station 110-1. Further, consider that the subscriber $S_{11}$ has sent its first OTA Registration/Affiliation Message on talkgroup TgA to Peer1 120-1. In turn, the Subscriber Steward 208 residing within Peer5 120-5 of subscriber $S_{11}$ 130-1 responds by sending a signal subscriberAffiliationMsgToTS(add) 1605 to Talkgroup Steward 210 residing within Peer4 120-4 of Talkgroup TgA. After receiving the subscriberAffiliationMsgToTS(add) signal 1605, the Talkgroup Steward 210 residing within Peer4 120-4 updates its masterTopology 211 to include information corresponding to the newly added subscriber $S_{11}$ 130-1. Further, the Talkgroup Steward 210 generates a TgTopology table when it is determined that the Peer1 120-1 is the first occurrence in the peerToWhichRegistered column of masterTgTopology table 211 maintained by the Talkgroup Steward 210 residing within Peer4 120-4. The Talkgroup Steward 210 residing within Peer4 120-4 sends the generated TgTopology table to each Peer 120 named in the peerToWhichRegistered column of masterTgTopology table 211. In this example, the Talkgroup Steward 210 residing within Peer4 120-4 sends TgTopology(TgA) signals 1610, 1620, and 1630 to Peer1 120-1, Peer5 120-2, and Peer3 120-3, respectively. Further, the Talkgroup Steward 210 residing within Peer4 120-4 initiates timers "TgTopologyTimer(Peer1)" 1615, "TgTopologyTimer(Peer5)" 1625, and "TgTopologyTimer(Peer3)" 1635. These respective timers, if expire before Peer4 TS(TgA) receives the TgTopologyAck signal, will cause a resend of the TgTopology(TgA) signal from Peer4 TS(TgA). Each of Peer1 120-1, Peer5 120-2, and Peer3 120-3 upon receiving the TgTopology(TgA) signals, sends acknowledgment signals TgTopologyAck(TgA) 1640, 1650, and 1660 respectively to Talkgroup Steward 210 residing within Peer4 120-4. After receiving the respective acknowledgment signals, the Talkgroup Steward 210 residing within Peer4 120-4 cancels the corresponding initiated timers 1615, 1625, and 1635 by issuing signals "TgTopologyTimerCancel(Peer1)" 1655, "TgTopologyTimerCancel(Peer5)" 1645, and "TgTopologyTimerCancel(Peer3)" 1665 respectively.

The Talkgroup Steward 210 residing within Peer4 120-4 then sends a deltaMasterTgTopology(backupindex) signal 1670 to another Talkgroup Steward acting as a secondary role provider (SRP) which then updates its local backupMasterTgTopology database based on the information received in the deltaMasterTgTopology(backupindex) signal 1670. In accordance with some embodiments, the signal deltaMasterTgTopology(backupindex) 1670 contains only one row of the masterTgTopology table maintained by the TS(TgA) 210 residing at Peer4 120-4. As used herein, it is to be understood that a signal defined as "deltaMasterTgTopology(backupindex)", employed in embodiments of the disclosure, implies a signal which carries a difference in information between an updated version of the masterTgTopology table maintained by a Talkgroup Steward 210 acting as an PRP and a version of the masterTgTopology table maintained by another Talkgroup Steward acting as an SRP. In this example, the difference corresponds to the row containing the first appearance of Peer1 in the masterTgTopology table maintained by TS(TgA) 210 residing at Peer4 120-4. In accordance with some embodiments, the backupindex is a large integer (e.g. 48 bits or more) which corresponds to the "$n^{th}$" version of the masterTgTopology table maintained in TS(TgA) 210 residing at Peer4 120-4. In this example, the backup Talkgroup Steward resides within the Peer5 120-5. Subsequently, the Talkgroup Steward 210 residing within Peer4 120-4 initiates a timer "deltaMasterTgTopologyTimer( )" 1675 which defines a time period within which the Subscriber Steward 208 expects an acknowledgment from the backup Talkgroup Steward residing within Peer2 120-2. The backup Talkgroup Steward residing within Peer5 120-5, upon updating its own resident copy of the backupMasterTgTopology table to match the masterTgTopology maintained by the TS(TgA) 210, sends an acknowledgment deltaMasterTgTopologyAck(backupindex) 1680 to the Talkgroup Steward 210 residing within Peer4 120-4. Upon receiving the acknowledgment deltaMasterTgTopologyAck(backupindex) 1680, the Talkgroup Steward 210 residing within Peer4 120-4 cancels the timer 1675 by issuing a signal "deltaMasterTgTopologyTimerCancel( )"

1685, and sends an acknowledgment subscriberAffiliationMsgAck( ) signal 1690 to the Subscriber Steward 208 residing within Peer5 120-5.

Figure 17:
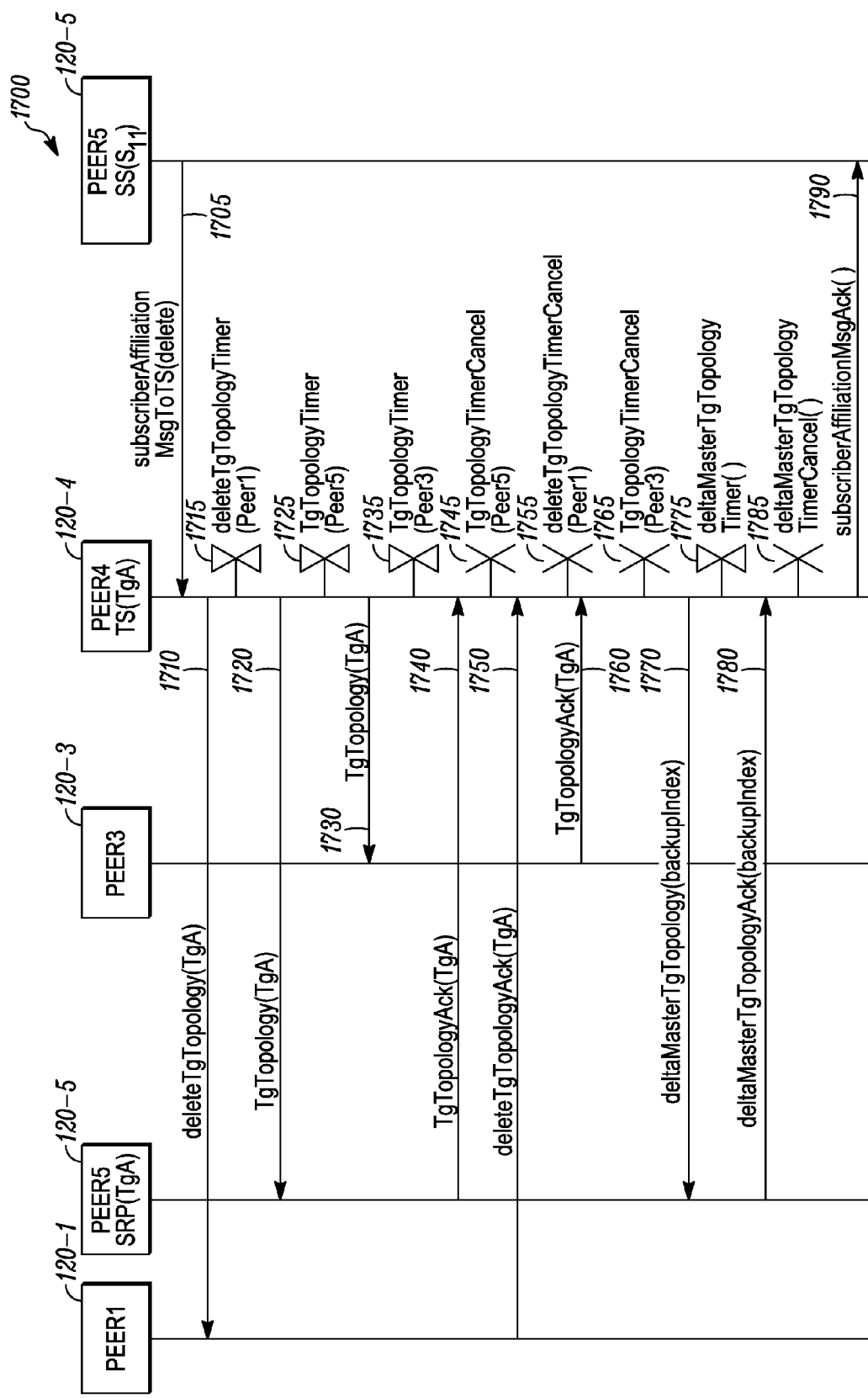
FIG. 17 is a signal flow diagram illustrating signal flows between different entities of a peer-to-peer wide area network when a subscriber changes a talkgroup affiliation from one talkgroup to another talkgroup in accordance with some embodiments.

FIG. 17 is a signal flow diagram 1700 illustrating signal flows between different entities of peer-to-peer wide area network 100 when a subscriber 130 changes a talkgroup affiliation from one talkgroup to another talkgroup. As illustrated in FIG. 17, when a subscriber $S_{11}$ 130-1 has changed the talkgroup to which it is affiliated from TgA to TgB, the Subscriber Steward 208 residing within Peer5 120-5 of subscriber $S_{11}$, in accordance with some embodiments, signals the Talkgroup Steward of TgA that subscriber $S_{11}$ 130-1 is no longer affiliated to TgA and then signals the TS 210 of TgB that subscriber $S_{11}$ 130-1 is affiliated to TgB. When the subscriber $S_{11}$ 130-1 changes affiliation from TgA to TgB, the Subscriber $S_{11}$ 130-1 initially signals the peer to which it is registered, for example, Peer1 120-1, a Registration/Affiliation Message including information related to its subscriberID and new talkgroup identification (TgB). The Peer1 120-1 then sends a subscriberRegistrationAffiliationMsgToSS signal to Subscriber Steward 208 residing at Peer5 120-5. In turn, the Subscriber Steward 208 generates a signal subscriberAffiliationMsgToTS(delete) 1705 and sends the generated signal 1705 to Talkgroup Steward 210 residing within Peer4 120-4 that controls the talkgroup TgA. The subscriberAffiliationMsgToTS(delete) signal 1705 includes information such as subscriberID=$S_{11}$, peerToWhichSubscriberRegistered=Peer1, slotOnWhichAffiliationRxed=1, TG=TgA, and tableModType=delete. The Peer4 120-4 may then update its masterTgTopology 211 to remove information corresponding to the subscriber $S_{11}$ 130-1. Further, the Talkgroup Steward 210 residing within Peer4 120-4 deletes the occurrence of Peer1 in the peerID column of its TgTopology. Subsequently, the Talkgroup Steward 210 signals deleteTgTopology(TgA) 1710 to Peer1 120-1 with which the subscriber is registered. Upon receiving the signal deleteTgTopology(TgA) 1710, the Peer1 120-1 may delete its TgTopology(TgA) table. Further, the Talkgroup Steward 210 sends the updated TgTopology table to each Peer 120 named in the peerToWhichRegistered column of the updated masterTgTopology table. In this example, the Talkgroup Steward 210 residing within Peer4 120-4 sends the TgTopology(TgA) signals 1720 and 1730 to Peer5 120-5 and Peer3 120-3, respectively. Further, the Talkgroup Steward 210 residing within Peer4 120-4 initiates timers "deleteTgTopologyTimer (Peer1)" 1715, "TgTopologyTimer(Peer5)" 1725, and "TgTopologyTimer(Peer3)" 1735 for Peer1 120-1, Peer5 120-5, and Peer3 120-3 respectively. If the timers 1715, 1725 and 1735 expire before receiving an acknowledgement from the respective Peers, Peer4 120-4 shall resend the TgTopology(TgA) signals. Each of Peer1 120-1, Peer5 120-5, and Peer3 120-3 upon receiving the signals 1710, 1720, and 1730, respectively, sends acknowledgment signals deleteTgTopologyAck(TgA) 1750, TgTopologyAck(TgA) 1740, and TgTopologyAck(TgA) 1760 respectively to Talkgroup Steward 210 residing within Peer4 120-4. After receiving the respective acknowledgment signals, the Talkgroup Steward 210 residing within Peer4 120-4 cancels the corresponding initiated timers 1715, 1725, and 1735 by issuing signals "deleteTgTopologyTimerCancel(Peer1)" 1755, "TgTopologyTimerCancel(Peer5)" 1745, and "TgTopologyTimerCancel(Peer3)" 1765 respectively.

The Talkgroup Steward 210 residing within Peer4 120-4 then sends a deltaMasterTgTopology(backupindex) signal 1770 to another Talkgroup Steward acting as a secondary role provider (SRP) which updates its local backupMasterTgTopology database based on the information received in the deltaMasterTgTopology(backupindex) signal 1770. In accordance with some embodiments, the signal deltaMasterTgTopology(backupindex) 1770 contains only one row of the masterTgTopology table maintained by the TS(TgA) 210 residing at Peer4 120-4. As used herein, it is to be understood that a signal defined as "deltaMasterTgTopology(backupindex)", employed in embodiments of the disclosure, implies a signal which carries a difference in information between an updated version of the masterTgTopology table maintained by a Talkgroup Steward 210 acting as an PRP and a version of the masterTgTopology table maintained by another Talkgroup Steward acting as an SRP. In this example, the difference corresponds to the deletion of the occurrence of Peer1 120-1 in the masterTgTopology table maintained by TS(TgA) 210 residing at Peer4 120-4 due to change of talkgroup affiliation of the subscriber $S_{11}$ 130-1 associated with the Peer1 120-1. In accordance with some embodiments, the backupindex is a large integer (e.g. 48 bits or more) which corresponds to the "$n^{th}$" version of the masterTgTopology table maintained in TS(TgA) 210 residing at Peer4 120-4. In this example, the backup Talkgroup Steward resides within the Peer5 120-5. Subsequently, the Talkgroup Steward 210 residing within Peer4 120-4 initiates a timer "deltaMasterTg Topology )" 1775 which defines a time period within which the Talkgroup Steward 210 expects an acknowledgment from the backup Talkgroup Steward residing within Peer5 120-5. The backup Talkgroup Steward residing within Peer5 120-5 sends an acknowledgment deltaMasterTgTopologyAck (backupindex) 1780 to the Talkgroup Steward 210 residing within Peer4 120-4. Upon receiving the acknowledgment deltaMasterTgTopologyAck(backupindex) 1780, the Talkgroup Steward 210 residing within Peer4 120-4 cancels the timer 1775 by issuing a "deltaMasterTgTopologyTimerCancel( )" 1585, and sends an acknowledgment subscriberAffiliationMsgAck( ) signal 1790 to the Subscriber Steward 208 residing within Peer5 120-5.

Applications

Consider that there is a network of peers of which several peers 120 (Peer1 120-1, Peer2 120-2, Peer3 120-3, and Peer4 120-4) have at least one subscriber 130 affiliated to the respective base station 110 on talkgroup Tg. Consider that the Talkgroup Steward 210 (TS) for Tg is on Peer5 120-5 that at least Peer1 120-1 has received a TgTopology(Tg) table from the TS 210. Considering that all the links are viable, the peers Peer1 120-1, Peer2 120-1, Peer3 120-3, and Peer4 120-4 need to be listed in the TgTopology table. Further consider that Peer1 has maintained at least one active port with Peer2 120-1, Peer3 120-3, and Peer4 120-4 as they are listed on the TgTopology(Tg) table.

When Peer1 120-1 receives a fast group communication media, for example, a fast start group call audio from a subscriber 130 (for example, a mobile radio) over the air whose destination is talkgroup Tg, Peer1 120-1 checks to see if the links to Peer2 120-2, Peer3 120-3, and Peer4 120-4 listed in the TgTopology table are still active. In one example, Peers 120 can exchange messages periodically to check if other Peers 120 are still active and accordingly update the TgTopology table to reflect the changes. The Peer1 then dereferences each active peerID (Peer2, Peer3, and Peer4) listed in the TgTopology table to a destination Internet Protocol (IP) address and User Datagram Protocol (UDP) port, and further packet duplicates the media (audio) for peers Peer2 120-2, Peer3 120-3 and Peer4 120-4. Next, the Peer1 120-1 unicasts the duplicated media packet to Peer2 120-2, Peer3 120-3, and Peer4 120-4 assuming that the link to each peer is still active. When Peer2 120-2, Peer3 120-3, and Peer4 120-4 receives the unicasted media packet, each peer extracts information related to the destination talkgroup and audio from the IP/UDP packet, applies appropriate floor control to the audio packet, and further formats the talkgroup ID and audio into the appropriate layer 2 (OSI link layer) signaling required for the specific outbound OTA protocol. Each of Peer2 120-2, Peer3 120-3, and Peer4 120-4 then transmits OTA the entire signal (talkgroup id and audio) to the designated subscribers 130 who are affiliated to talkgroup Tg.

Therefore, a packet of media (audio) is sent unicast directly to each Peer on the TgTopology table to which Peer1 120-1 still has an active connection (the audio is not sent to TS=Peer5 120-5). The destinations have been pre-established before a group call to talkgroup Tg has arrived OTA from a subscriber 130 to Peer1 120-1. Because only the necessary destination stations (Peer2 120-2, Peer3 120-3, and Peer4 120-4) in the P2P WAN 100 receive the media (audio) from Peer1 120-1 and transmit media (audio) OTA, both RF channel and wired network bandwidth resources for the entire P2P WAN 100 are conserved. Note, upon receiving audio from a subscriber 130, Peer1 120-1 need only packet duplicate media (audio) and send the media (audio) without waiting for acknowledgments from the downstream peers or a centralized controller, thereby enabling a group communication (call) faster with low access/throughput delay while maximizing the radio frequency channel capacity of the P2P WAN 100.

In accordance with embodiments described above, the implementation of the disclosure produces a fault tolerant system by having the processes located on more than one Peer 120, such that if one Talkgroup Steward 210 faults, a group call for the particular Talkgroup can still remain operational without compromise. Further, the implementation of the disclosure reduces bandwidth consumption by having control signaling for a given talkgroup forwarded to only one process that handles that talkgroup for the entire WAN instead of flooding the talkgroup affiliation information to all of the Peers 120 unnecessarily. Further, the OTA channel resource consumption is kept minimal by listing only the Peers 120 which have at least one subscriber 130 affiliated to the talkgroup Tg in the masterTgTopology table 211. Further, routing a derived TgTopology table to all such Peers enables only the necessary Peers to transmit audio for a specified talkgroup, thereby conserving system resources. Further, the Talkgroup Steward 210 entity which establishes paths between all of the Peers 120 for a given talkgroup is located in one place, thereby making the state maintenance of the subscribers and the talkgroups significantly simpler. Finally, the implementations of the disclosure enables fast group call setup by pre-establishing the routes, such that, upon receiving an OTA call, the Peer 120 simply packet duplicates the audio and sends according to the pre-established routes to each destination station, thereby eliminating the delay incurred by routing control between station endpoints or a central controller.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a first peer base station to facilitate fast group communication between subscriber devices in a peer-to-peer wide area network of a plurality of peer base stations, wherein each of the subscriber devices is affiliated to one of a plurality of talkgroups and registered to at least one peer base station within the peer-to-peer wide area network, the method comprising:

the first peer base station exchanging messages with one or more other peer base stations in the plurality to determine which ones of the other peer base stations, are still actively serving one or more subscriber devices that are members of a same particular talkgroup of the plurality of talkgroups as particular talkgroups with which active subscriber devices registered with the first peer base station are members of, and for each particular talkgroup, storing a mapping identifying which ones of the other peer base stations are actively serving subscriber devices associated with the particular talkgroup;

the first peer base station receiving a first media intended for a first one of the particular talkgroups from a first one of the subscribe devices registered with the first peer base station;

the first peer base station duplicating the media intended for the first one of the particular talkgroups; and the first peer base station unicasting the duplicated media to each of the one or more other peer base stations, as a function of the stored mapping, that are listed as actively serving subscriber devices associated with the first one of the particular talkgroups to enable the one or more of the other peer base stations to further deliver the duplicated media to their respectively registered subscriber devices associated with the first one of the particular talkgroups.

2. The method of claim 1, further comprising
receiving the unicasted duplicated media at a second peer base station the plurality;

the second peer base station extracting information related to a destination talkgroup and content of the duplicated media;

the second peer base station formatting the information related to the destination talkgroup and content of the media into a link layer signal; and the second peer base station sending the formatted link layer signal overthe air to designated subscriber devices affiliated to the destination talkgroup.

3. The method of claim 1, further comprising:
designating at least one of the plurality of peer base stations as a subscriber steward, the subscriber steward configured to regulate a state of each of a plurality of assigned subscriber devices and ensure that each assigned subscriber device in the plurality is associated with only one particular talkgroup of the plurality of talkgroups; and for each of the particular talkgroups, designating at least one of the plurality of peer base stations as a talkgroup steward configured to (i) act as a clearinghouse of subscriber device associations and dissociations with the particular talkgroup, (ii) receive updates to group membership from other peer base stations relative to the particular talkgroup; and (iii) distribute group membership updates for the particular talkgroup to each of the plurality of peer base stations actively serving subscriber devices associated with the particular talkgroup.

4. The method of claim 3, further comprising receiving, by the designated subscriber steward peer base station, an inbound registration and affiliation message a new subscriber device assigned to the subscriber steward, the inbound registration and affiliation establishing the registration of the at least one new subscriber device with a peer base station and including new talkgroup association information.

5. The method of claim 4, the method further comprising the designated subscriber steward peer base station, responsive to receive the inbound registration and affiliation message from the new subscriber device, transmitting an update request message to the talkgroup steward peer base station associated with the talkgroup designated in the new talkgroup association information requesting that the new subscriber device be added to the talkgroup designated in the new talkgroup association information.

6. The method of claim 4, further comprising the talkgroup steward peer base station associated with the talkgroup designated in the update request message, responsive to receiving the update request message, adding the new subscriber device to the talkgroup designated in the new talkgroup association information and distributing a first group membership update to each of the plurality of peer base stations actively serving subscriber devices associated with the talkgroup designated in the update request message.

7. The method of claim 3, further comprising:
maintaining, by the subscriber steward, information related to a communication slot on which a peer base station has received a registration message from each of the plurality of assigned subscriber devices and a registration expiration time representing a time value occurring in the future at which the registration of the subscriber device with the peer base station expires.

8. The method of claim 7, further comprising the subscriber steward configured to, responsive to expiration of one of the registration expiration times with respect to an expired subscriber device, transmit an update to the talkgroup steward designated for the particular talkgroup with which the expired subscriber is associated requesting deletion of the expired subscriber device from the particular talkgroup with which the expired subscriber is associated.

9. The method of claim 3, further comprising:
designating at least one of the plurality of peer base stations as a backup subscriber steward configured to receive updates from the subscriber steward anytime the subscriber steward makes any changes to the state of each of the plurality of assigned subscriber devices, and to take over operation as primary subscriber steward in the event the subscriber steward becomes nonoperational or inaccessible;

for each of the particular talkgroups, designating at least one of the plurality of peer base stations as a backup talkgroup steward configured to receive updates from each talkgroup steward, respectively, anytime the respective talkgroup steward makes any changes to the group membership of a particular group with which the talkgroup steward is associated, and to take over operation as primary talkgroup steward in the event the respective talkgroup steward becomes nonoperational or inaccessible.

10. The method of claim 1, the first peer base station unicasting the duplicated media to each of the one or more of the other peers base stations, as a function of the stored mapping, that are listed as actively serving subscriber devices associated with the first one of the particular talkgroups further comprises the first peer base station refraining from unicasting the duplicated media to at least one peer base station in the plurality that is not set forth in the stored mapping as actively serving any subscriber devices associated with the first one of the particular talkgroups.

11. A method for facilitating fast group communication between subscribers in a peer-to-peer wide area network, wherein each of the subscribers are affiliated to a talkgroup, and further registered to at least one peer within the peer-to-peer wide area network, the method comprising:
   at a subscriber steward within one of the at least one peer:
      maintaining a master subscriber topology database including information related to at least one subscriber assigned to the subscriber steward, a peer to which each of the at least one subscriber is registered, and a talkgroup to which each of the at least one subscriber is affiliated; and
      sending an update to a talkgroup steward that controls a talkgroup about information related to one or more of the at least one subscriber that are affiliated to the talkgroup;
   at the talkgroup steward within one of the at least one peer:
      updating a master talkgroup topology database based at least in part on the update received from the subscriber steward, the master talkgroup topology database including information related to the one or more of the at least one subscriber affiliated to the talkgroup controlled by the talkgroup steward, and a peer to which each of the one or more of the at least one subscriber is registered;
      generating a talkgroup topology including information related to one or more peers with which the one or more of the at least one subscriber affiliated to the talkgroup are still registered; and
      sending the talkgroup topology to each of the one or more peers, such that, when a subscriber of the one or more of the at least one subscriber registered with one of the one or more peers initiates a group communication for the talkgroup, the one of the one or more peers duplicates media associated with the group communication and sends the duplicated media to only those peers which information is included in the talkgroup topology, for delivery of the media to the respectively registered subscribers affiliated to the talkgroup,
   wherein the subscriber steward is a network entity that regulates the state of each assigned subscriber and ensures affiliation of the assigned subscriber to a specific talkgroup and the talkgroup steward keeps track of all subscribers that are members of a particular talkgroup.

12. The method of claim 11, further comprising receiving, by the subscriber steward, an inbound registration and affiliation message periodically from the at least one subscriber assigned to the subscriber steward, the inbound registration and affiliation establishing the registration of the at least one subscriber with a peer.

13. The method of claim 12, further comprising, at the subscriber steward:
   determining that the subscriber steward has not received the inbound registration and affiliation from the at least one subscriber for a predefined time period;
   notifying the talkgroup steward controlling the talkgroup with which the at least subscriber is affiliated to inform that the subscriber is no longer affiliated to the talkgroup controlled by the talkgroup steward; and
   updating the master subscriber topology database to remove information related to a peer with which the at least one subscriber was registered.

14. The method of claim 11, further comprising periodically sending, by the subscriber steward, information related to the at least one subscriber maintained in the master subscriber topology database to a backup subscriber steward of the at least one subscriber to enable the backup subscriber steward to perform the functions of the subscriber steward in case of failure of the subscriber steward.

15. The method of claim 11, further comprising periodically sending, by the talkgroup steward, information related to the one or more of the at least one subscriber maintained in the master talkgroup topology database to a backup talkgroup steward for the talkgroup to enable the backup talkgroup steward to perform the functions of the talkgroup steward in case of failure of the talkgroup steward.

16. The method of claim 11, further comprising maintaining, by the subscriber steward, information related to a communication slot on which a peer has received a registration message from the at least one subscriber, and registration expiration time representing a time value occurring in the future at which the registration of the at least one subscriber with the peer expires.

17. The method of claim 11, further comprising maintaining, by the talkgroup steward, information related to a communication slot on which a peer has received a registration message from the one or more of the at least one subscriber affiliated to the talkgroup, and affiliation expiration time representing a time value occurring in the future at which an affiliation of the one or more of the at least one subscriber with the talkgroup expires.

18. The method of claim 11, further comprising, at the subscriber steward:
   receiving a subscriber registration affiliation message from the peer to which the at least one subscriber is registered, the subscriber registration affiliation message including information related to the peer to which the first subscriber is registered, and the talkgroup to which the at least one subscriber is affiliated; and
   comparing the information for the at least one subscriber included in the received subscriber registration affiliation message with the information included in the master subscriber topology database corresponding to the at least one subscriber.

19. The method of claim 18, further comprising at the subscriber steward:
   determining that the information related to at least one of the peer to which the at least one subscriber is registered or the talkgroup to which the at least one subscriber is affiliated contained in the received subscriber registration affiliation message is different from the corresponding information stored for the at least one subscriber in the master subscriber topology database;

sending a subscriber affiliation message to the talkgroup steward controlling a talkgroup to which the at least one subscriber is affiliated, the subscriber affiliation message including information related to the at least one subscriber, the peer to which the at least one subscriber is registered, and the talkgroup to which the at least one subscriber is affiliated; and updating information for the at least one subscriber maintained in the master subscriber topology database based on the corresponding information of the at least one subscriber in the received subscriber registration affiliation message.

20. The method of claim 19, further comprising:

receiving, by the talkgroup steward, the subscriber affiliation message from the subscriber steward of the at least one subscriber, and updating, by the talkgroup steward, the master talkgroup topology database to update information about the at least one subscriber based on the received subscriber affiliation message.

21. The method of claim 20, further comprising, at the talkgroup steward:

determining whether the peer to which the at least one subscriber is registered, is already listed in the master talkgroup topology database, when the peer to which the at least one subscriber is registered is not already listed in the master talkgroup topology database, updating the talkgroup topology to include information related to the peer to which the at least one subscriber is registered, and sending the updated talkgroup topology to each peer listed in the updated talkgroup topology.

22. The method of claim 18, further comprising at the subscriber steward:

determining that the information related to at least one of the peer to which the at least one subscriber is registered or the talkgroup to which the at least one subscriber is affiliated contained in the received subscriber registration affiliation message is different from the corresponding information stored for the at least one subscriber in the master subscriber topology database;

sending a subscriber affiliation message to the talkgroup Steward controlling a talkgroup with which the subscriber has de-affiliated, the subscriber affiliation message including information related to the at least one subscriber, the peer to which the at least one subscriber is registered, and the talkgroup to which the at least one subscriber has de-affiliated; and updating information for the at least one subscriber maintained in the master subscriber topology database based on the corresponding information of the at least one subscriber in the received subscriber registration affiliation message.

23. The method of claim 22, further comprising receiving, by the talkgroup steward, the subscriber affiliation message from the subscriber steward of the at least one subscriber, and removing information about the at least one subscriber from the master talkgroup topology database based on the received subscriber affiliation message.

24. The method of claim 23, further comprising, at the talkgroup steward:

determining whether the peer to which the at least one subscriber is registered, is listed only once in the master talkgroup topology database, when the peer to which the at least one subscriber is registered is listed only once in the talkgroup topology, updating the talkgroup topology to remove information related to the peer to which the at least one subscriber is registered, and sending the updated talkgroup topology to each peer currently listed in the updated talkgroup topology.

25. A system for facilitating fast group communication between subscribers in a peer-to-peer wide area network, wherein each of the subscribers are affiliated to a talkgroup, and further registered to at least one peer within the peer-to-peer wide area network, the system comprising:

a subscriber steward configured within a peer to:

maintain information related to at least one subscriber assigned to the subscriber steward, a peer to which each of the at least one subscriber is registered, and a talkgroup to which each of the at least one subscriber is affiliated, and update a talkgroup steward controlling a talkgroup about the information related to one or more of the at least one subscriber that are affiliated to the talkgroup; and a talkgroup steward configured within a peer:

maintain information related to one or more subscribers affiliated to the talkgroup controlled by the talkgroup steward, and a peer to which each of the one or more subscribers is registered, and periodically update information about a list of peers with which one or more subscribers affiliated to the talkgroup are still registered based on the update received from the subscriber steward, such that when a subscriber affiliated to the talkgroup initiates a fast group communication for the talkgroup, a peer with which the subscriber is registered, duplicates media received from the subscriber for the fast group communication and sends duplicated media to only the peers in the list, for delivery of the media to the respectively registered subscribers affiliated to the talkgroup, wherein the subscriber steward is a network entity that regulates the state of each assigned subscriber and ensures affiliation of the assigned subscriber to a specific talkgroup and the talkgroup steward keeps track of all subscribers that are members of a particular talkgroup.

* * * * *

UNITED STATES PATENT AND TRADEMARK OFFICE
CERTIFICATE OF CORRECTION

PATENT NO. : 8,189,583 B2
APPLICATION NO. : 12/240966
DATED : May 29, 2012
INVENTOR(S) : LoGalbo et al.

Page 1 of 1

It is certified that error appears in the above-identified patent and that said Letters Patent is hereby corrected as shown below:

In Column 27, Line 51, in Claim 2, delete "comprising" and insert -- comprising: --, therefor.

In Column 27, Line 61, in Claim 2, delete "over the air" and insert -- over-the-air --, therefor.

In Column 30, Line 14, in Claim 14, delete "comprising" and insert -- comprising: --, therefor.

In Column 30, Line 22, in Claim 15, delete "comprising" and insert -- comprising: --, therefor.

In Column 30, Line 30, in Claim 16, delete "comprising" and insert -- comprising: --, therefor.

In Column 30, Line 38, in Claim 17, delete "comprising" and insert -- comprising: --, therefor.

In Column 30, Line 59, in Claim 19, delete "comprising" and insert -- comprising, --, therefor.

In Column 31, Line 34, in Claim 22, delete "comprising" and insert -- comprising, --, therefor.

Signed and Sealed this
Eighth Day of January, 2013

David J. Kappos
*Director of the United States Patent and Trademark Office*